US008849249B2

(12) United States Patent
Rishy-Maharaj et al.

(10) Patent No.: US 8,849,249 B2
(45) Date of Patent: Sep. 30, 2014

(54) DEVICES AND SYSTEMS THAT OBTAIN AND MANAGE SUBSCRIPTIONS FOR ACCESSING WIRELESS NETWORKS ON AN AD HOC BASIS AND METHODS OF USE

(75) Inventors: Ravi Rishy-Maharaj, Palo Alto, CA (US); Ira Anthony Wyant, Palo Alto, CA (US)

(73) Assignee: Gigsky, Inc., Palo Alto, CA (US)

( * ) Notice: Subject to any disclaimer, the term of this patent is extended or adjusted under 35 U.S.C. 154(b) by 0 days.

(21) Appl. No.: 13/479,091

(22) Filed: May 23, 2012

(65) Prior Publication Data

US 2013/0165075 A1    Jun. 27, 2013

Related U.S. Application Data

(60) Provisional application No. 61/489,228, filed on May 23, 2011, provisional application No. 61/489,636, filed on May 24, 2011.

(51) Int. Cl.
H04M 1/66 (2006.01)
H04W 12/04 (2009.01)

(52) U.S. Cl.
CPC .................................. *H04W 12/04* (2013.01)
USPC ....................................................... 455/411

(58) Field of Classification Search
USPC ....................................................... 455/411
See application file for complete search history.

(56) References Cited

U.S. PATENT DOCUMENTS

| | | |
|---|---|---|
| 5,943,619 A | 8/1999 | Coyne |
| 6,081,711 A | 6/2000 | Geulen |
| 6,507,649 B1 | 1/2003 | Tovander |
| 6,515,997 B1 | 2/2003 | Feltner et al. |
| 6,782,258 B2 | 8/2004 | Ung et al. |
| 6,823,061 B2 | 11/2004 | Prasad et al. |
| 7,151,931 B2 | 12/2006 | Tsao et al. |
| 7,664,504 B2 | 2/2010 | Bishop |
| 7,818,000 B2 | 10/2010 | Lin et al. |
| 8,086,855 B2 | 12/2011 | Katz et al. |
| 8,117,123 B1 | 2/2012 | Gailloux et al. |
| 8,331,907 B2 | 12/2012 | Jiang |
| 8,391,915 B2 | 3/2013 | Bishop |
| 8,478,238 B2 | 7/2013 | Mohammed et al. |
| 8,520,583 B2 | 8/2013 | Kasslin et al. |
| 2002/0025809 A1 | 2/2002 | Ung et al. |
| 2003/0118001 A1 | 6/2003 | Prasad et al. |
| 2003/0120920 A1* | 6/2003 | Svensson ....................... 713/168 |
| 2003/0235175 A1* | 12/2003 | Naghian et al. ................ 370/338 |

(Continued)

FOREIGN PATENT DOCUMENTS

| | | |
|---|---|---|
| EP | 2139170 A1 | 12/2009 |
| EP | 2139180 A1 | 12/2009 |

(Continued)

*Primary Examiner* — Joel Ajayi

(74) *Attorney, Agent, or Firm* — David Lewis

(57) ABSTRACT

Herein disclosed is an embodiment of a system for connecting a wireless device to a local network of local mobile server systems on an ad hoc basis after the wireless device has left the manufacturer. The system may have instructions, which when invoked cause the implement a process including at least receiving, at the wireless device, credential data from the local network of local mobile server systems. The system may also write the credential data to a device memory system, wherein the credentials are received on an ad hoc basis after the wireless device has left the manufacturer.

21 Claims, 18 Drawing Sheets

(56) References Cited

U.S. PATENT DOCUMENTS

| | | |
|---|---|---|
| 2004/0128509 A1* | 7/2004 | Gehrmann .................. 713/171 |
| 2004/0192295 A1 | 9/2004 | Tsao et al. |
| 2004/0235455 A1 | 11/2004 | Jiang |
| 2006/0246949 A1 | 11/2006 | Gupta et al. |
| 2006/0291455 A1 | 12/2006 | Katz et al. |
| 2007/0015514 A1 | 1/2007 | Bishop |
| 2007/0027815 A1 | 2/2007 | Sobel et al. |
| 2007/0281694 A1 | 12/2007 | Lin et al. |
| 2008/0107064 A1 | 5/2008 | Erol et al. |
| 2009/0217058 A1 | 8/2009 | Obereiner et al. |
| 2009/0305666 A1 | 12/2009 | Tian et al. |
| 2010/0099401 A1 | 4/2010 | Bishop |
| 2011/0176424 A1 | 7/2011 | Yang et al. |
| 2011/0283001 A1 | 11/2011 | Jung et al. |
| 2012/0281609 A1 | 11/2012 | Kasslin et al. |
| 2012/0282891 A1 | 11/2012 | Mohammed et al. |
| 2012/0302284 A1 | 11/2012 | Rishy-Maharaj et al. |
| 2013/0165075 A1 | 6/2013 | Rishy-Maharaj et al. |
| 2013/0217361 A1 | 8/2013 | Mohammed et al. |
| 2013/0273911 A1 | 10/2013 | Mohammed et al. |
| 2014/0012627 A1 | 1/2014 | Swanson et al. |
| 2014/0012699 A1 | 1/2014 | Abdelrahman et al. |
| 2014/0012707 A1 | 1/2014 | Abdelrahman et al. |
| 2014/0012708 A1 | 1/2014 | Abdelrahman et al. |
| 2014/0012709 A1 | 1/2014 | Bishop et al. |
| 2014/0012710 A1 | 1/2014 | Abdelrahman et al. |
| 2014/0012711 A1 | 1/2014 | Dey et al. |
| 2014/0012712 A1 | 1/2014 | Eng et al. |
| 2014/0012713 A1 | 1/2014 | Bishop et al. |
| 2014/0012856 A1 | 1/2014 | Abdelrahman et al. |

FOREIGN PATENT DOCUMENTS

| | | |
|---|---|---|
| EP | 2432278 A1 | 3/2012 |
| WO | WO/98/49862 A2 | 11/1998 |
| WO | WO/00/36852 A2 | 6/2000 |
| WO | WO/00/78068 A1 | 12/2000 |
| WO | WO/02/05531 A1 | 1/2002 |
| WO | WO/02/093811 A2 | 11/2002 |
| WO | WO/2004/075484 A2 | 9/2004 |
| WO | WO/2007/011632 A1 | 1/2007 |
| WO | WO/2008/087251 A1 | 7/2008 |
| WO | WO/2009/060261 A2 | 5/2009 |
| WO | WO/2009/149600 A1 | 12/2009 |
| WO | WO/2009/151553 A1 | 12/2009 |
| WO | WO/2012/038696 A1 | 3/2012 |
| WO | WO/2012/150376 A1 | 11/2012 |
| WO | WO/2013/085852 A1 | 6/2013 |
| WO | WO/2013/142615 A1 | 9/2013 |
| WO | WO/2013/160673 A1 | 10/2013 |

* cited by examiner

DEVICES AND SYSTEMS THAT OBTAIN AND MANAGE SUBSCRIPTIONS FOR ACCESSING WIRELESS NETWORKS ON AN AD HOC BASIS AND METHODS OF USE

CROSS-REFERENCE TO RELATED APPLICATIONS

This application claims priority benefit of U.S. Provisional Patent Application No. 61/489,228, entitled "DEVICES AND SYSTEMS THAT OBTAIN AND MANAGE SUBSCRIPTIONS FOR ACCESSING WIRELESS NETWORKS ON AN AD HOC BASIS AND METHODS OF USE," filed May 23, 2011, by Ravi Rishy-Maharaj, which is incorporated herein by reference; this application also claims priority benefit of U.S. Provisional Patent Application No. 61/489,636, entitled "SYSTEMS AND METHODS FOR REUSING A SUBSCRIBER IDENTITY MODULE FOR MULTIPLE NETWORKS," filed May 24, 2011, by Ravi Rishy-Maharaj, which is incorporated herein by reference.

FIELD

This specification generally relates to systems for establishing and maintaining subscriptions for networks.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

Devices accessing cellular and data networks typically are limited to using the services of a primary network provider with limited coverage areas. When a user leaves the coverage areas, the user is often compelled to pay enhanced charges for roaming. The subscriber identity module ("SIM") typically limits a user from accessing networks with local coverage if the networks are not part of the core of the primary network provider. The primary network provider has specific access to the SIM, because the SIM has a secret authentication code, which may be any of $K_i$s, Ks, or any other code typically kept secret between the manufacturer of the SIM or the wireless device and the networks to which the SIM or wireless device may connect. When referring to Ks in the specification, it is merely as an example of any secret authentication code. In this specification any reference to $K_i$ may be replaced with K and any reference to K may be replaced with $K_i$ to get a different embodiment. The Ks are provided when the SIM is manufactured and are protected by software such that the only entities with access to the Ks are the SIM manufacturer, the primary network provider and the internal software of the SIM.

This can make travelling very expensive, as a business traveler will often be outside of the traveler's primary network coverage area, and the business traveler will be forced to pay roaming charges. Roaming charges can be unnecessary if a local network is willing to provide coverage on an ad hoc basis.

Some have tried to expand the capacity of the SIM by allowing a second set of credentials to the SIM, hence allowing a device to access both the primary and secondary networks without paying roaming charges when in the primary or secondary coverage areas. Choosing the second authentication key by determining the credentials that are installed before the SIM leaves the manufacturer offers the user no choice as to the secondary network provider. Preventing ad hoc subscription and access in a place where neither the first nor the second networks have primary coverage imposes upon the consumer unnecessary roaming charges. It also limits the number of subscription options a particular traveler may have in a location. For instance, the subscriber may want to have an unlimited data plan in a certain area, or will only require coverage in a particular area for a week. People have also attempted to use roaming hubs to establish connections with local services, but roaming hubs do not provide a dynamic enough option to avoid roaming charges. It does not offer the user ad hoc connectivity at any location and limits subscription options.

BRIEF DESCRIPTION OF THE FIGURES

In the following drawings, like-reference numbers refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just address one deficiency that may be discussed in the specification, and some embodiments may not address any of these deficiencies.

In general, at the beginning of the discussion of each of FIGS. 1A-14 is a brief description of each element, which may have no more than the name of each of the elements in the one of FIGS. 1A-14 that is being discussed. After the brief description of each element, each element is further discussed in numerical order. In general, each of FIGS. 1A-14 is discussed in numerical order and the elements within FIGS. 1A-14 are also usually discussed in numerical order to facilitate easily locating the discussion of a particular element. Nonetheless, there is no one location where all of the information of any element of FIGS. 1A-14 is necessarily located. Unique information about any particular element or any other aspect of any of FIGS. 1A-14 may be found in, or implied by, any part of the specification.

Figure 1A:
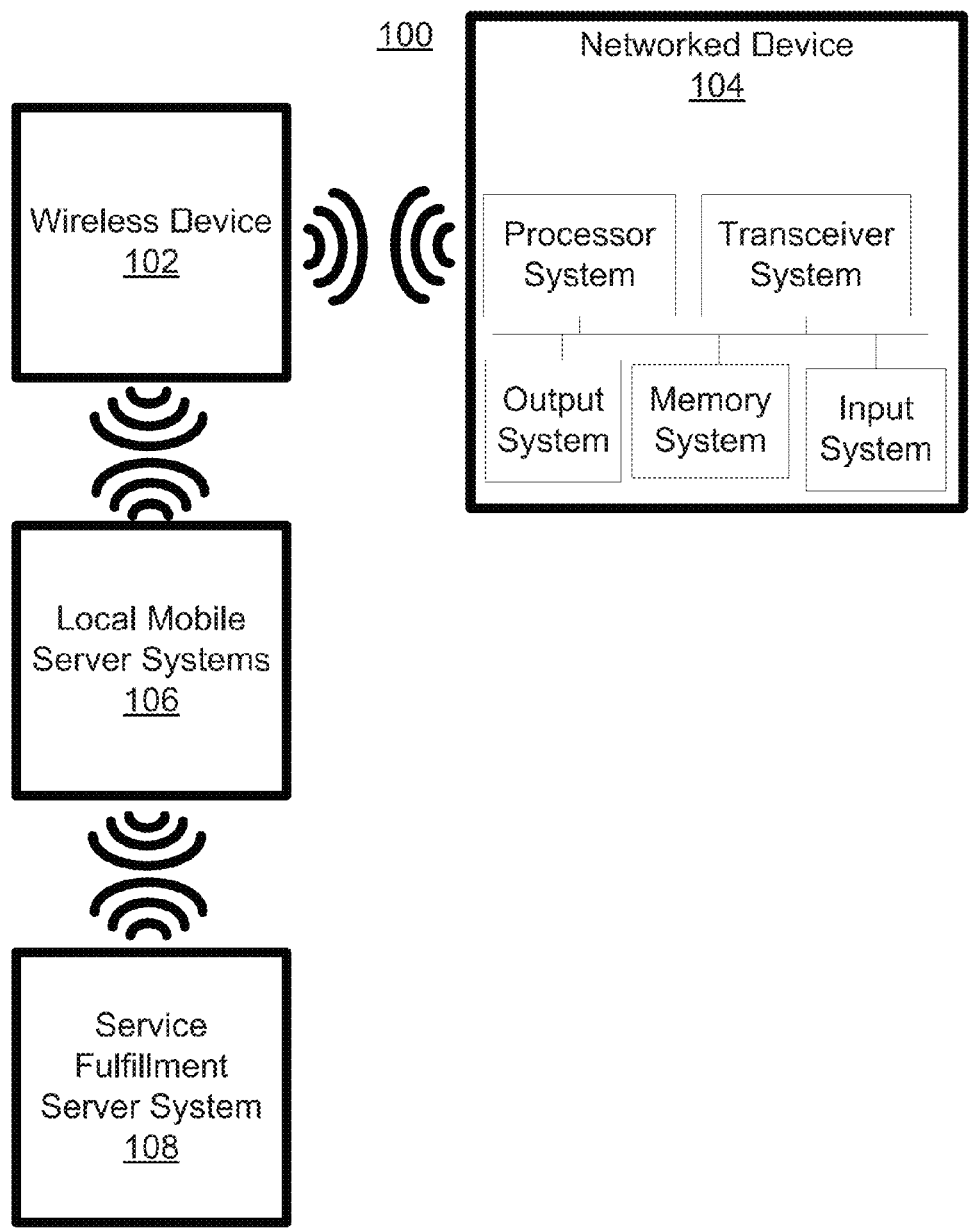
FIG. 1A shows a block diagram of an embodiment of a system to obtain and manage subscriptions for accessing wireless networks on an ad hoc basis.

FIG. 1A shows an embodiment of a system to obtain and manage subscriptions for accessing wireless networks on an ad hoc basis. The system 100 may include a wireless device 102, a networked device 104, local mobile server systems 106, and a service fulfillment server system 108, for example. In other embodiments, the system 100 may not have all of the elements listed and/or may have other elements in addition to or instead of those listed.

In an embodiment, wireless device 102 is a portable routing device that is capable of connecting to secure networks that require subscriptions on an ad hoc basis. In another embodiment, wireless device 102 may be any wireless electronic device capable of connecting to a network, such as a phone, personal desktop assistant ("PDA"), laptop computer, tablet, or netbook, for example.

Connecting on an ad hoc basis implies that one is connecting to a network with new credentials even after a wireless device 102 or its SIM device has left the manufacturer. In the prior art, the wireless device or SIM device would be restricted to receiving local service from a primary and possibly a secondary provider after the wireless device 102 or the SIM device of wireless device 102 has been embedded with a primary and potentially secondary K at the time of manufacturing or personalization. Connecting on an ad hoc basis means that the wireless device 102 can accept new credentials from a local network in order to avoid paying roaming charges for data usage and can accept the new credentials after the wireless device 102 and/or the SIM device of wireless device 102 leaves the manufacturer.

The new credentials may include a new a secret authentication code, which may be any of $K_i$s, Ks, or any other code typically kept secret between the manufacturer of the SIM or the wireless device and the networks to which the SIM or the wireless device connect. When referring to $K_i$s in the specification, it is merely as an example of any secret authentication code that is known only to the wireless device or its SIM device, the manufacturer and the subscribed-to network, such as Ks. The $K_i$, International Mobile Subscription Identity ("IMSI"), and location area identity, for example. The $K_i$ is a 2G authentication key, whereas K is a 3G authentication key.

The K or $K_i$ may be a 128 bit code that is present on prior art SIM devices (as mentioned before in prior art SIM device the K or $K_i$ is not changed after the manufacturing or personalization process, whereas in the current SIM device, K may be changed). The IMSI may be a number used to identify an individual or device on a mobile network. The IMSI may include a mobile country code, a mobile network code and the mobile subscriber identity number. The location area number may describe the location of the wireless device 102.

In one embodiment, the wireless device 102 may have a simulated universal subscriber identity module ("USIM") stored in the wireless device memory system. Credentials may be electronically transmitted to a USIM. In one embodiment, the wireless device 102 may connect to code division multiple access networks ("CDMA") and do so using a removable user identity module ("R-IUM") in substantially the same way as a SIM.

The wireless device 102 may communicate with other networks and devices using any wireless protocol including, for example, Wi-Fi, Wi-Max, 2G, 3G, 4G, 4G LTE, UMTS, other satellite communication, or radio via a transceiver. The wireless device 102 may be configured to communicate wirelessly with a local hotspot network, the local mobile server system, the service fulfillment network and/or the networked device.

In one embodiment of the invention, a user may be in a location in which the user's primary service provider only provides roaming service. The user may choose to use a wireless device 102 to connect to another local network in order to avoid roaming charges. The wireless device 102 may transmit requests for subscriptions from a user of the wireless device to the service fulfillment server system. Transmitting requests for subscriptions may be accomplished via any routing network including the local network, a Wi-Fi network locally, or a Wi-Max network locally, for example. In embodiments in which an unsubscribed-to network is used to initially gain a new subscription, the user may have to pay roaming charges to connect to the service fulfillment server system. Alternatively, the wireless device may use other channels to establish a subscription including, unstructured supplementary data ("USSD") protocols, short message service ("SMS") protocols with the roaming profile, or other Internet protocol ("IP") communication channels, for example.

The wireless device 102 may be configured to suppress communication with certain networks. For instance, a network may be local, but the service fulfillment server system may not have a contract to offer service for that network. The wireless device 102 may prevent the wireless device 102 from accessing networks that would require the wireless device 102 or its user to pay roaming charges. The suppression of signal may also be used to prevent competitive services from communicating with the wireless device 102 in order to gain a competitive advantage.

The local mobile server system 106 provides local subscriptions that may be less expensive than the roaming charges of a user's subscribed-to data network when a user is outside of the primary coverage area of the user's primary data network. The local mobile server systems 106 may be any network, mobile network operator, server, computer, or other data management system, for example, which is capable of managing data. The local mobile server systems 106 may generate a local network to which devices may connect.

When referring to "server systems," the specification discloses that server systems can include one or more servers running on one or more machines. The server systems may provide a network of services. Although only one embodiment of the local mobile server systems is shown in FIG. 1A, which includes only one computing device, the local mobile server systems 106 may have any number of servers and/or computing devices.

In one embodiment, the local mobile server systems 106 may be controlled by a mobile network operator. A mobile network operator is a provider of wireless communications services that owns or controls all the elements necessary to sell and deliver services to an end user including radio spectrum allocation. What distinguishes mobile network operators from other networks is that the mobile network owns or controls access to a radio spectrum license from a regulatory or government entity. Mobile network operators are loathe to allow people to directly access the mobile network operators' networks on an ad hoc basis. Mobile network operators require that a wireless device 102 have a manufacturer installed K code that is known only to the mobile network operator, the original manufacturer, and the device memory system to allow the wireless device 102 access to the local network of the local mobile server systems 106. In one embodiment, the local mobile server systems 106 is part of a network of a mobile network operator, and may allow the wireless device to connect on an ad hoc basis and transmit Ks and IMSIs to the wireless device 102 or to the SIM device of wireless device 102.

The service fulfillment server system ("SFSS") 108 is a server that coordinates data subscriptions and allows the user located outside of the coverage area of the user's current subscriptions to subscribe-to a local network with local network coverage. In allowing users not subscribed to the network of SFSS 108 to connect to the network of SFSS 108, the SFSS 108 may provide the wireless device 102 with local service at a rate far less than the roaming rates the user's subscribed-to plan may charge in a particular location.

The SFSS 108 may be any network, server, computer, or other data management system, for example, which is capable of managing data. The SFSS 108 may comprise any number of computing devices. The SFSS 108 may receive a request to subscribe to a local network from the wireless device 102. The SFSS 108 may determine the location of the user, for example, by GPS, and determine, based on the location, the available local networks. One of the local networks that the wireless device 102 may request to subscribe may be the routing network used to subscribe to the local network or may be the local network itself, for example.

Upon determining the available local networks, the SFSS 108 may also accumulate data regarding the subscription terms of the local networks. The SFSS 108 may then transmit the data regarding the available local networks and the networks' respective subscription terms to the wireless device 102.

In one embodiment, the SFSS 108 may transmit data representing mobile network operators. The larger network providers generally require that a mobile device 102 have proper credentials including a K and an IMSI in order to gain access to the mobile network operators. Unlike some of the pay-as-you-go hotspots, the mobile network operators do not allow users to add new credentials for accessing the networks of the larger network providers. The SFSS 108 may be configured to transmit Ks and IMSIs to the wireless device 102, such that the mobile networks providers will allow a direct connection to the wireless device 102 with the wireless device 102 considered to be a subscribed device.

In one embodiment, the wireless device 102 may itself select the best value for a local network based on preferences created by the user or based on preprogrammed defaults. In an alternative embodiment, the user may select the plan that best suits the user's needs. For instance, there may be a plan that lasts for a month and costs $300 and allows for the use of 100 minutes of cell phone time and 3 gigabytes of data. Another plan may offer only a week of coverage with 25 gigabytes of data and 200 minutes of talk time and only cost $75. If the person will only be in the location for a week or if the person requires more talk time or data transfer services, the latter plan may be better. In the embodiment in which the user selects the plan to be used, the wireless device 102 may have a display to display the terms of service and have a user input device to allow the user to select the preferred plan. Alternatively, the wireless device 102 may transmit the subscription list with terms of service to be displayed on another device.

When a subscription selection has been made, the wireless device 102 may transfer data representing the network and plan selected as well as an agreement to accept terms of service to the SFSS 108. The SFSS 108 may account for the change in the subscription register of SFSS 108. The SFSS 108 may then transmit the request to the selected local mobile server systems 106.

The local mobile server systems 106 may be configured to periodically transmit new terms of service, areas of service, or services offered, for example, to update the SFSS Location Register on the SFSS 108. In doing so, the local mobile server systems 106 provides up-to-date information regarding the services the local mobile server systems 106 offers to those who choose to use the SFSS 108 to subscribe.

The local mobile server systems 106 may receive a subscription request from the wireless device 102, via the SFSS 108. Upon receiving the initial request to subscribe to the local mobile server systems 106, the local mobile server systems 106 may determine that the wireless device 102 is not subscribed to the local mobile server systems 106. Upon determining this, the local mobile server systems 106 may add information identifying the wireless device 102 to its visitor location register in order to record that a person who is not subscribed attempted to connect.

Upon accepting the subscription request, the local mobile server systems 106 may transfer the identification information associated with the wireless device 102 to the home location register, representing that the wireless device is now subscribed to, and can access, the local network, via the local mobile server systems 106.

The entity controlling the SFSS 108 may have contracts with the entity controlling the local network such that the local mobile server systems 106 may transmit a confirmation of the subscription as well as confidential credentials that the wireless device 102 can use to access the local network, via local mobile server systems 106. The credentials that allow the access may include, for instance, an international subscription identity ("IMSI"), encryption keys ("$K_c$"), Ks, and/or location information, for example. Confidential transfer of credentials may be accomplished by encrypting the credentials (for accessing the local network) and sending the encrypted credentials from the local network of interest to SFSS 108, and then from SFSS 108, via local mobile server systems 106 (which may or may not be associated with the same local network as the local network of interest), to wireless device 102, for example. The encrypted data may be decrypted by the wireless device 102 and/or by the SFSS 108. When the credentials are transferred to the wireless device 102, the data may be stored in the memory of the wireless device 102 or on a separate or integrated SIM device, for example.

In another embodiment, the SFSS 108 may be consulted for determining which local networks are available and/or the terms of service offered by the available local networks, and all other operations may be carried out between the wireless device 102 and the local mobile server systems 106. In this embodiment, the SFSS 108 may not communicate with the local mobile server systems 106 except to receive data representing updated services and terms of service. The wireless device 102 could communicate with the SFSS 108 only in order to find the local subscriptions.

When the confirmation of the subscription is transferred to the SFSS 108 and the wireless device 102, the SFSS 108 and the wireless device 102 may update the subscription profiles stored in the subscription register and the device memory system to account for a change in a particular wireless device's 102 subscription profile. A subscription profile may be data describing the different subscriptions. The subscription profile may have data including the wireless device's 102 location, information about available wireless transceivers, network identification, signal strength, types of service, service terms, the remaining benefits of a subscriber account, terms for termination of the account, device information, login history, and/or data for encryption, for example.

Upon receiving credentials, the wireless device 102 may request that the SIM 104 yield (e.g., allow access to or send) credentials to the wireless device 102 using a personal identification number. The wireless device 102 may then transmit the credentials to the local mobile server systems 106. The local mobile server systems 106 may receive the credentials and allow the wireless device access to transmit and receive data from the local mobile server systems 106. The subscription profile may include subscription information (which may include credentials specific to particular subscriptions that have already been purchased, such as an account number and/or password) from a variety of networks covering different locations to allow a user to avoid roaming charges in areas in which the user has already purchased a plan. The subscription profile may allow a user to access local networks seamlessly when traveling between network coverage areas without worrying about roaming charges.

In one embodiment, the wireless device 102 may be configured to operate a mobile, wireless hotspot for other devices, and may include a routing engine that routes signals from local networks to the specific network devices associated with a particular local network from which the signal originated. The wireless device 102 may operate a local hotspot network used to connect a networked device 104 with the wireless device 102. For instance, the wireless device may make an ad hoc connection to local mobile server systems 106 requiring a subscription and then transmit wirelessly information to other devices connected to the wireless device 102.

The local hotspot network may provide data network connectivity from the wireless device 102 to the networked device 104. The local hotspot network may be any kind of data transfer medium including, wired, wireless, satellite or fiber optic, for example and may be generated by the wireless device 102 or another device, for example.

The networked device 104 is a device that can connect to the wireless device 102 via the local hotspot network, potentially capitalizing on a subscription to local mobile server systems 106 to provide data from the local mobile server systems 106 without accruing roaming charges. The networked device 104 may be any electronic device capable of networking with other devices including, for example, a computer, a server, a cellular phone, a router, or personal desktop assistant. Networked device 104 may include some back-end components. Networked device 104 may include a network transceiver (which is denoted as a transceiver system in FIG. 1A), CPU (which is denoted as a processor system in FIG. 1A), memory system, and optionally an output system, which may include a display and optionally an input system.

Upon contacting the local mobile server systems 106 in response to a request from the wireless device 102, the SFSS 108 may determine that a wireless device's subscription has ended or that the subscription's credits or funds have been depleted. The SFSS 108 may offer the wireless device 102 an opportunity to renew a subscription or to add credits or funds to the account of the wireless device 102. Upon receiving more funds from the wireless device, the SFSS 108 may reestablish a subscription with the local mobile server systems 106.

Figure 1B:
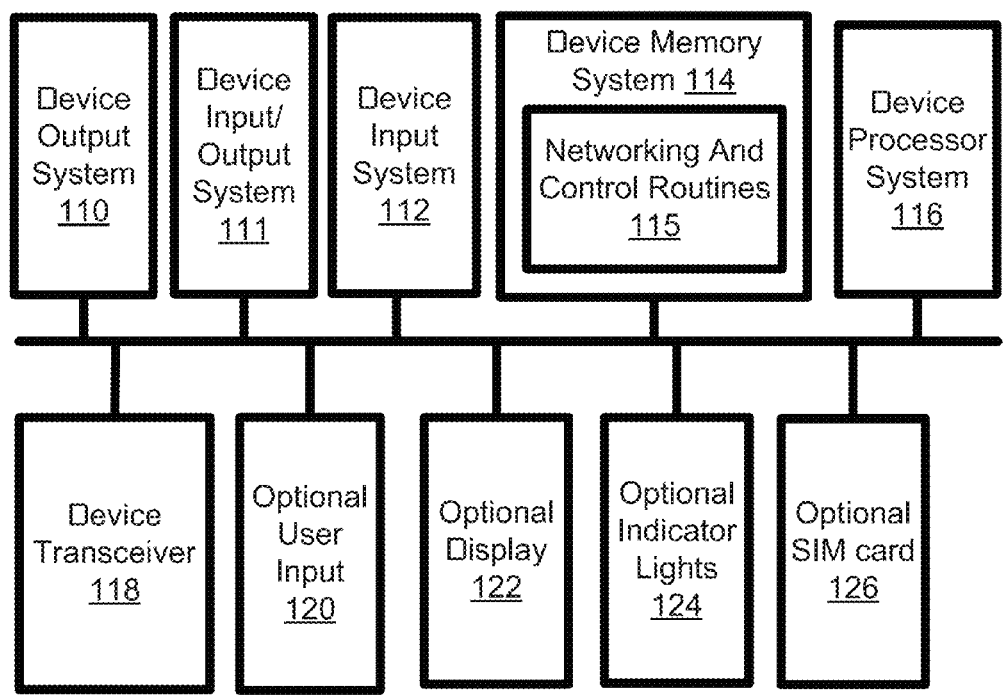
FIG. 1B. shows a block diagram of an embodiment of the wireless device of FIG. 1A.

FIG. 1B shows a block diagram of an embodiment of the wireless device 102. The wireless device 102 may include a device output system 110, device input system 112, device memory system 114, networking and control routines 115, device processor 116, device transceiver 118, optional user input 120, optional display 122, and optional indicator lights 124. In other embodiments, the wireless device 102 may not have all of the elements listed and/or may have other elements in addition to or instead of those listed.

The device output system 110 may include any one of, some of, any combination of, or all of a display system, a speaker system, a connection or interface system to a sound system, an interface system to peripheral devices and/or a connection and/or a interface system to a computer system, intranet, and/or internet, and the like. The device output system 110 may include a monitor and/or other output device. The device output system 110 may include an interface for sending output signals to the networked device 104 or the optional communications bus 104.

The input system 112 may include any of, some of, any combination of, or all of a keyboard system, an interface to receive credential and subscription data, a mouse system, a track ball system, a track pad system, buttons on a handheld system, a scanner system, a microphone system, a touchpad system, and/or a connection and/or interface system to a computer system, intranet, and/or internet (e.g., IrDA, USB), and the like.

The device memory system 114 may store algorithms and data for networking, subscribing to networks, credential management, and subscription management, for example. The device memory system 114 may include, for example, any one of, some of, any combination of, or all of a long term storage system, such as a hard drive; a short term storage system, such as a random access memory. In an embodiment, device memory 114 may include a removable storage system such as a disk drive, floppy drive or a removable drive; and/or flash memory. The device memory system 114 may include one or more machine-readable media that may store a variety of different types of information. The term machine-readable media may be used to refer to any non-transient medium capable of carrying information that is readable by a machine. One example of a machine-readable medium is a computer-readable medium. The memory system 114 may also store variables, intermediates, results, constants, and the like necessary to execute the analysis and control routines. For instance, the device memory system 114 may store subscription profiles, data regarding credentials, or preconfigured settings for the wireless device 102 to select a network itself.

Figure 1C:
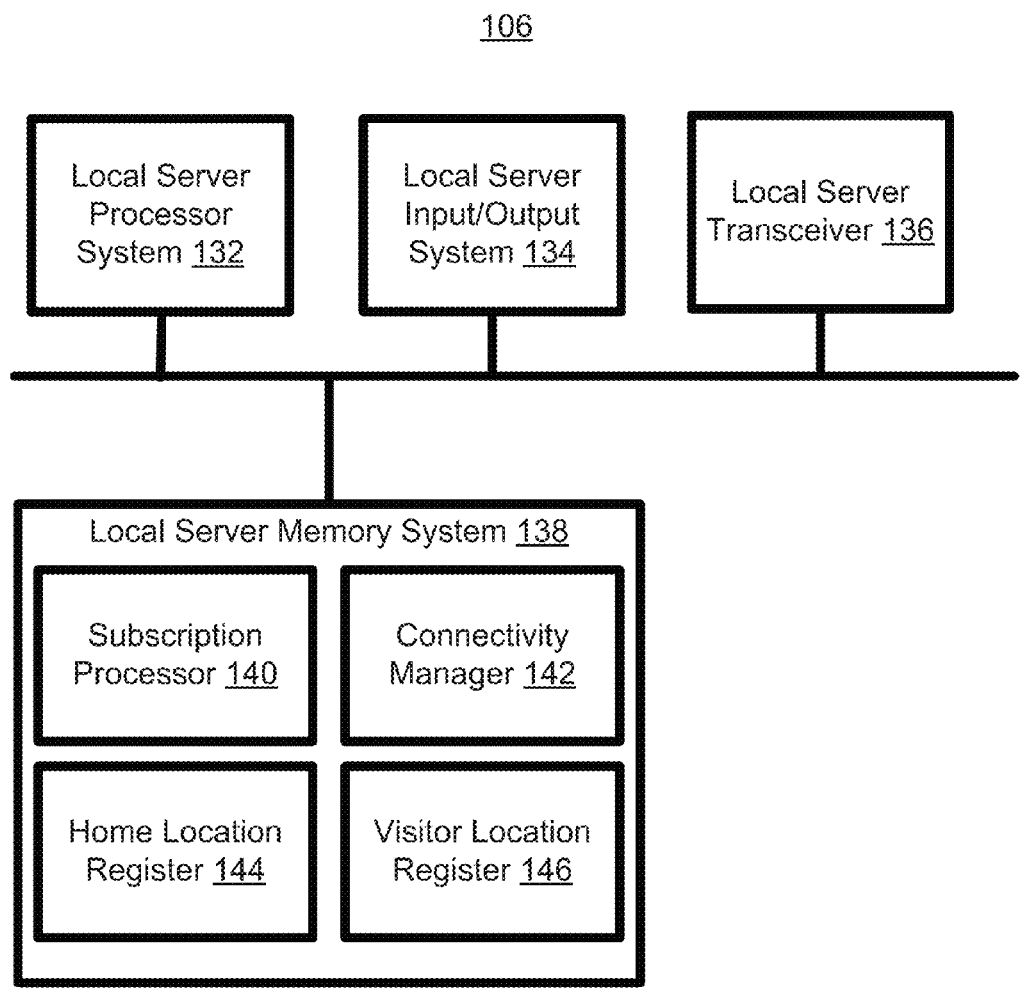
FIG. 1C shows a block diagram of an embodiment of local mobile server systems of FIG. 1A.
Figure 1D:
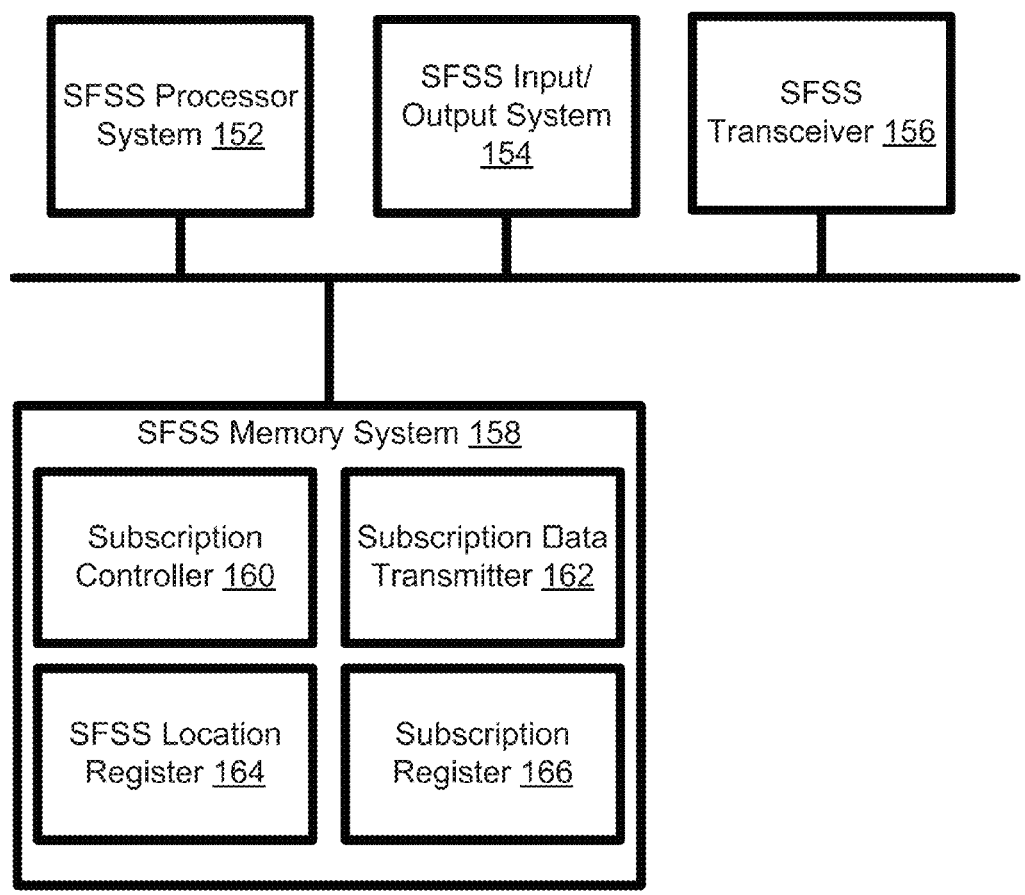
FIG. 1D shows a block diagram of an embodiment of a SFSS of FIG. 1A.
Figure 1E:
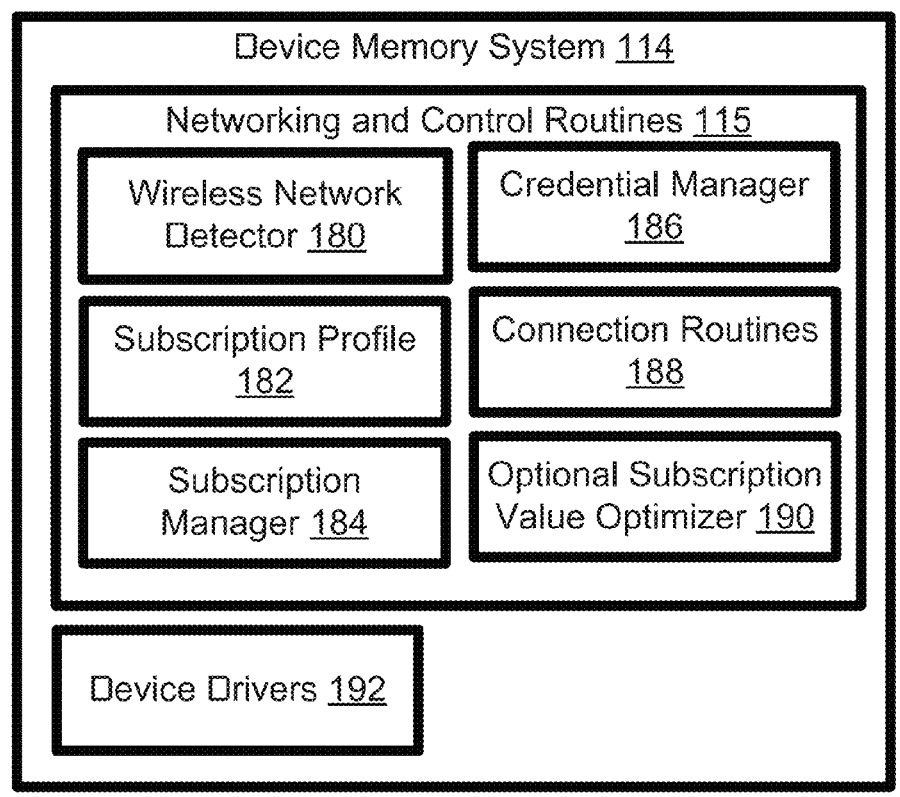
FIG. 1E shows a block diagram of an embodiment of the device memory system of the wireless device of FIG. 1B.

The network and control routines 115 may include, for example, a wireless network detector, subscription profile, subscription manager, credential manager, connection routines, optional subscription value optimizer, and/or device drivers, in order to accomplish the computations mentioned in the embodiment shown in FIG. 1E. The device memory system 114 may include at least one memory device and may be configured to store the applications necessary to provide instructions to the network and control routines 115.

The device processor system 116 runs the algorithms and networking and control routines 115 stored in the device memory system 114. Consequently, the device processor system 116 may execute instructions in the networking and control routines 115 in order to accomplish all, some or any of the following: (1) retrieve a list of potential networks to which wireless device 102 can connect locally, (2) determine whether any local network is a subscribed-to network, (3) if it is determined that there is no subscribed-to network, retrieve data from the SFSS 108 regarding local networks and the local networks' subscription terms, (4) optionally, select the network to which to establish a subscription using a value optimizer, (5) optionally, display the available subscriptions and terms and allow the user to select a subscription, (6) transmit the selection to the SFSS 108, (7) receive credentials to access the then subscribed-to network, (8) store the received credentials on the device memory system 114, (9) update the subscription profile in the device memory system 114 to account for a new subscription, (10) access the network, (11) operate a local hotspot network to which other devices may connect as networked devices 104, via wireless device 102, and (12) request to renew or add credits or funds to an account, for example. Embodiments of these and other functions of the networking and control routines are described at greater length in the embodiment of the device memory system 114 in FIG. 1E.

The device processor system 116 may include any one of, some of, any combination of, or all of multiple parallel processors, a single processor, a system of processors having one or more central processors, a logic circuit and/or one or more specialized processors dedicated to specific tasks.

The device transceiver 118 is a data transmission device used to communicate data between the wireless device 102 and the SFSS 108 as well as the local mobile server systems 106. The transceiver functions as a transmitter and receiver of data including, for example, requests for data regarding local networks, credential data, subscription data, or subscription selection data. In an alternative embodiment, the transceiver may include as a transmitter and receiver separately. The device transceiver 118 may include an antenna. The device transceiver 118 may communicate with other networks and devices using any wireless protocol including Wi-Fi, Wi-Max, 2G, 3G, 4G, 4G LTE, UMTS, GSA, other satellite communication, or radio, for example.

Optional user input 120 is an interface via which a user may input choices, such as which local network to select. In an embodiment where the user selects the subscription used by the wireless device 102, the device input system 112, may receive instructions from an optional user input 120. The optional user input 120 may be anything configured to receive selections from a user including, for example, a keypad, virtual keyboard, or microphone. In other embodiments, optional user input 120 (if present) may include a keyboard, mouse, touch pad, or trackball. The user may use the optional user input 120 to select the particular local network subscription that suits the user best.

Optional display 122 may be used for displaying information to the user about how to operate wireless device 102, about available local networks, prompts for proceeding through the process of selecting a local network, and/or adding funds to an established subscription. In one embodiment, the wireless device 102 may communicate image data with an optional display 122, via the device output system 110. If the wireless device 102 offers a user the option of choosing a network to which the user may subscribe, the wireless device 102 may transmit data to display a list of networks with terms of subscription on the optional display 122. The optional display 122 may be any display capable of rendering images, including, by way of example, a monitor, laptop screen, netbook screen, cellular phone, smart device, personal desktop assistant or projector. The optional display 122 may be a part of the wireless device 102 or the wireless device 102 may have a video output by which it can connect to an external image display device.

The optional indicator light 124 may include one or more lights, which may be of different colors. The optional light 124 may function as a communication between the user of the wireless device 102 and the wireless device 102. The optional indicator lights 124 may be used to indicate that wireless device 102 is searching for networks, retrieving subscription data, connecting to a network, transmitting data to other networks, transmitting data over a local hotspot network, and maintaining a connection with networked devices 104, for example.

The Optional SIM card ("SIM") 126 is a device used to provide credential data for gaining access to networks. The SIM 126 may store credentials from the primary data network to which the wireless device 102 is subscribed and could potentially store credentials from the local mobile server systems 106 on an ad hoc basis. The SIM 126 may also be a typical SIM that is programmed not to be adjusted after it leaves the factory and hence may store only credentials from a primary network, and new credentials for new subscriptions may be stored elsewhere. The SIM 126 may also be simulated by an application stored on the device memory system 114 and operate as a universal subscriber identity module, for example. In an embodiment where the wireless device 102 includes the SIM 126, the wireless device 102 may transmit a personal identification number to the SIM 126 in order to authenticate the wireless device 102 and allow the SIM to release its stored credentials.

FIG. 1C shows a block diagram of an embodiment of a local mobile server systems 106. The local mobile server systems 106 may include a local server processor system 132, a local server input/output system 134, a local server transceiver 136, a local server memory system 138, a subscription processor 140, a connectivity manager 142, a home location register 144 and a visitor location register 146. In other embodiments, the local mobile server systems 106 may not have all of the elements listed and/or may have other elements in addition to or instead of those listed.

The local server processor system ("LSPS") 132 executes the networking and subscription functions and handles data related to the networking and subscription functions. Networking and subscription functions may include a subscription processor, connectivity manager, home location register, and visitor location register (all described in greater detail below).

The LSPS 132 may include any one of, some of, any combination of, or all of multiple parallel processors, a single processor, a system of processors having one or more central processors, a logic circuit and/or one or more specialized processors dedicated to specific tasks.

The local server input/output system ("LSIOS") 134 may be used to transmit data to peripherals and receive data from peripherals in order to accomplish networking and control objectives. The LSIOS 134 may include any one of, some of, any combination of, or all of a display system, a printer system, a speaker system, a connection or interface system to a sound system, an interface system to peripheral devices and/or a connection and/or an interface system to a computer system, intranet, and/or internet, a keyboard system, an interface to receive image data, a mouse system, a track ball system, a track pad system, buttons on a handheld system, a scanner system, a microphone system, a touchpad system, for example.

The LSIOS 134 may be used to receive administrator commands from the local network via a user input, for example, a keyboard. The LSIOS 134 may also be used to display images and/or to send information for rendering webpages relevant to the workings of the local mobile server systems 106.

The local server transceiver 136 is a data transmission device used to communicate data between the wireless device 102 and the SFSS 108 as well as the local mobile server systems 106. The transceiver may include an antenna, a transmitter, and a receiver of data including, for example, requests for data regarding local networks, credential data, subscription data, and subscription selection data. In an alternative embodiment, the transceiver may include a separate transmitter and receiver. The local server transceiver 136 may communicate with other networks and devices using any wireless protocol including Wi-Fi, Wi-Max, 2G, 3G, 4G, 4G LTE, UMTS, other satellite communication, or radio, for example.

The local server memory system ("LSMS") 138 may store algorithms for managing subscriptions and transmitting data. The local server processor system ("LSPS") 132 executes the networking and subscription functions stored in the LSMS 138 and handles data related to the networking and subscriptions functions. The LSMS 138 may include, for example, any one of, some of, any combination of, or all of a long term storage system, such as a hard drive; a short term storage system, such as a random access memory; a removable storage system such as a disk drive, floppy drive or a removable drive; and/or flash memory. The LSMS 138 may include one or more machine readable media that may store a variety of different types of information. The term machine-readable media may be used to refer to any medium capable of carrying information that is readable by a machine. One example of a machine-readable medium is a computer-readable medium. The machine readable medium may be non-transitory.

The LSMS 138 is used to store the applications and data necessary to provide instructions in order to execute networking and subscription functions on the local mobile server systems 106. The LSMS 138 may include at least one memory device and may store networking and subscription routines. Networking and subscription routines may include a subscription processor 140, a connectivity manager 142, a home location register 144, and a visitor location register 146, for example.

The subscription processor 140 manages all subscription functions on the local mobile server systems 106. The subscription processor 140 may be a routine for a processor to execute in order to transmit data regarding services and terms of service to the SFSS 108. The subscription processor 140 may store appropriate identification and subscription data to the LSMS 138. The subscription processor 140 may transmit credentials and subscription data to the wireless device 102 and the SFSS 108. The subscription processor 140 may create a subscription file when a user or wireless device 102 attempts to access the local network. The subscription processor 140 may store the subscription profile in either the home location register or the visitor location register. The subscription processor 140 may transfer subscription and identification information from the visitor location register to the home location register when a subscription is established, recharged or renewed. The subscription processor 140 may determine if a subscription is current or has sufficient funds or credits for access to the local mobile server systems 106. The subscription processor 140 may receive instructions to renew a subscription or add credits or funds to an account, for example. The subscription processor controls all subscriptions used to access the local mobile server systems 106

The connectivity manager 142 determines whether wireless devices 102 should have access to the local mobile server systems 106. The connectivity manager 142 may receive credentials from wireless devices 102 in order to determine whether the wireless devices 102 have the credentials to enter the network securely and under an expected contract. The connectivity manager 142 may receive the credentials from the wireless device 102 and compare the credentials received from wireless device 102 to the credentials stored in its home location register. These credentials may include an IMSI, encryption key or a K, for example. If the credentials are correct and up-to-date, the connectivity manager 142 may allow the wireless device 102 to connect to the local mobile server systems 106. In one embodiment, the connectivity manager 142 may be an authentication center used by the local mobile server systems 106 to authenticate a wireless device 102 or a SIM 104 of wireless device 102.

The Home Location Register ("HLR") 144 stores subscription data and credentials in order to track subscriptions and determine whether a user or device has a subscription that is current. Subscription profiles stored on the HLR 144 are considered to belong to users or devices that are subscribed to the local network of local mobile server systems 106.

The Visitor Location Register ("VLR") 146 stores subscription information of users or wireless devices 102 who/which do not have a current subscription. When a wireless device 102 or user attempts to access the local mobile server systems 106 without a subscription, the subscription processor 140 may create a subscription profile and store the subscription profile in the VLR 146.

The LSMS 138 may also store variables, intermediates, results, constants, and the like necessary to execute the networking and subscription routines. For instance, the LMNS 138 may store any intermediates used in the process of confirming that the credentials of a wireless device 102 match those of a subscription profile stored in the HLR 144.

The local mobile server systems 106 may include any number of computing devices.

FIG. 1D shows a block diagram of an embodiment of a SFSS 108. The SFSS 108 operates as a central network to which varieties of local networks connect and offer terms for local subscription. The SFSS 108 may include a SFSS processor system 152, a SFSS input/output system 154, a SFSS transceiver 156, a SFSS memory system 158, a subscription controller 160, a subscription data transmitter 162, a SFSS location register 164, and a subscription register 166. In other embodiments, the SFSS 108 may not have all of the elements listed and/or may have other elements in addition to or instead of those listed.

The SFSS processor system ("SFPS") 152 executes instructions in order to allow a wireless device 102 to receive a subscription to a local network to avoid roaming charges.

The SFPS 152 may include at least one processor device and may be configured to execute SFSS functions including, for example, a subscription controller, a subscription data transmitter, a SFSS location register, and a subscription register stored in the SFSS memory system (the SFSS functions are explained in greater detail below).

The SFPS 152 may include any one of, some of, any combination of, or all of multiple parallel processors, a single processor, a system of processors having one or more central processors, a logic circuit and/or one or more specialized processors dedicated to specific tasks.

The SFSS input/output system ("SFIOS") 154 is a device or devices that connect peripherals to the SFIOS 108. The SFIOS 154 may be used to transmit data to peripherals and receive data from peripherals in order to accomplish networking and control objectives. The SFIOS 154 may include any one of, some of, any combination of, or all of a display system, a printer system, a speaker system, a connection or interface system to a sound system, an interface system to peripheral devices and/or a connection and/or an interface system to a computer system, intranet, and/or internet, a keyboard system, an interface to receive image data, a mouse system, a track ball system, a track pad system, buttons on a handheld system, a scanner system, a microphone system, a touchpad system, for example.

The SFIOS 154 may be used to receive administrator commands from the local network via a user input, for example, a keyboard. The SFIOS 154 may also be used to display images relevant to the workings of the SFSS 108.

The SFSS transceiver 156 is a data transmission device used to communicate data between the SFSS 108 and the wireless device 102 as well as the local mobile server systems 106. The SFSS transceiver 156 functions as a transmitter and receiver of data including, for example, requests for data regarding local networks, credential data, subscription data, and subscription selection data. In an alternative embodiment, the transceiver may include a transmitter and separate receiver. The local server transceiver 136 may communicate with other networks and devices using any wireless protocol including Wi-Fi, Wi-Max, 2G, 3G, 4G, 4G LTE, UMTS, other satellite communication, or radio, for example.

The SFSS memory system ("SFMS") 158 stores subscription data and SFSS functions. The SFMS 158 may include, for example, any one of, some of, any combination of, or all of a long-term storage system, such as a hard drive; a short term storage system, such as a random access memory; a removable storage system such as a disk drive, floppy drive or a removable drive; and/or flash memory. The SFMS 158 may include one or more machine-readable media that may store a variety of different types of information. The SFMS 158 is used to store the applications and data necessary to execute SFSS functions on the SFSS 108. SFSS functions may include a subscription controller 160, a subscription data transmitter 162, a SFSS location register 164, and a subscription register, for example.

The subscription controller 160 manages all of the subscription operations between the wireless device 102 and the local mobile server systems 106. The subscription controller 160 may be executed by the HPS 152 in order to manage subscriptions. The subscription controller 160 may manage receipt of current available services and terms of service from the local networks 130 and store them in the SFSS location register. Upon receipt of a request to subscribe to a local network from a wireless device 102, the subscription controller 160 may request from the local mobile server systems 106 to transfer subscription information and network credentials to the wireless device 102. Upon confirmation of subscription, the subscription controller 160 may receive from the local mobile server systems 106 subscription information for a particular wireless device 102 and store the subscription information in the subscription register.

In the event that a subscription is not current or its credits or funds have been depleted, the subscription controller 160 may also be configured to notify the wireless device that a new transaction must occur to renew the subscription. The subscription controller 160 may receive funds in order to renew a subscription. The subscription controller 160 may write data reflecting a renewed subscription to the subscription register when a subscription is renewed.

In one embodiment, the subscription controller 160 may be responsible for communications and transactions between the local mobile server systems 106 and the wireless device 102. For instance, all monies, subscription information and credentials may transfer between the wireless device 102 and the local mobile server systems 106 via the SFSS 108.

The subscription data transmitter 162 transmits subscription data, including a subscription profile between the wireless device 102, the local mobile server systems 106 and the SFSS 108. The subscription data transmitter 162 may transmit messages with an encryption to ensure security.

The SFSS location register 164 is a services directory that stores data regarding which services and terms of service are available in any particular area. For instance, the SFSS location register 164 may store data representing that a network called Mercury, located in Zimbabwe, may have a plan for a month with 300 minutes of talk time and 50 gigabytes of data transfer. The SFSS location register 164 may receive information about services and terms of service from the local networks 130 in various locations. The SFSS location register 164 may store a number of networks for a particular location and may store different service plans for each network. In one embodiment, the SFSS location register 164 may be a services directory called an available plans database.

The subscription register 166 is the record the SFSS keeps of a particular user or wireless device's 102 subscriptions and credentials. The subscription register 166 may contain the subscription profile, which itself may contain all of the data regarding the networks to which the wireless device 102 or user is subscribed. The subscription register can be used by the SFSS 108 to determine at the outset whether a user has a local subscription in a particular locale.

FIG. 1E shows a block diagram of an embodiment of the device memory system 114. The device memory system 114 may include networking and control routines 115 including, for example, a wireless network detector 180, a subscription profile 182, a subscription manager 184, a credential manager 186, connection routines 188, and an optional value optimizer 190. The device memory system 114 may also include device drivers 192. In other embodiments, the device memory system 114 may not have all of the elements listed and/or may have other elements in addition to or instead of those listed.

The wireless network detector 180 is a module used to detect if there are any available local networks. The wireless network detector 180 may be executed by the device processor 114 and may detect via the device transceiver 118 available local networks 130. The wireless network detector 114 may be configured to detect a routing network used to connect to the SFSS 108. The routing network may be the local mobile server systems 106, themselves.

The subscription profile 182 is data that represents the different subscriptions and credentials a wireless device may use to connect to networks. The subscription profile may contain data including the device's location, information about available wireless transceivers, network identification, signal strength, types of service, service terms, remaining benefits of a subscriber account, terms for termination of the account, device information, log-in history, or data for encryption, for example.

The subscription manager 184 is responsible for all subscription services within the wireless device 102. The subscription manager 184 may be executed by the device processor 114 to manage the wireless device's 102 subscriptions. The subscription manager 184 may be configured to create, maintain, and transmit subscription information found in the subscription profile.

When the wireless device 102 searches for local subscribed-to networks, it may utilize the subscription manager 184 to search through the subscription profile 182 to determine if any of the local networks are subscribed-to. When subscribing to a new network, the subscription manager 184 may update the subscription profile 182 with the terms of the new subscription and the locations where the subscription is valid. The subscription manager 184 may transmit the subscription profile 182 to the SFSS 108 and the local mobile server systems 106 when a user or wireless device 102 subscribes, in order to update the subscription register 166, HLR 144 and VLR 146.

The subscription manager 184 may also detect that a subscription is no longer current or that an account for the subscription no longer has any credits or funds. In response to a payment to make the subscription effective, the subscription manager 184 may adjust the subscription profile 182 in order to account for the new terms of the subscription. The subscription manager 184 may also transmit the updated subscription profile 182 to the SFSS 108 and the local mobile server systems 106 in order to update the subscription register 166, HLR 144 and VLR 146.

The credential manager 186 is responsible for managing the credentials of the wireless device 102. The credential manager 186 updates the subscription profile 182 whenever the list of credentials changes. Credentials may change when the user or wireless device 102 subscribes to a new network. In one embodiment, the credentials may change whether for want of funds or credits or by failing to keep the subscription current, each time a subscription becomes ineffective.

The credential manager 186 is also responsible for providing credentials when trying to access a network. The credential manager 186 may provide credentials for a subscribed-to network and gain access. The credential manager 186 may also transmit credentials to an unsubscribed-to network, likely leading to a failed log-in attempt. The credential manager may provide credentials to recently subscribed-to local mobile server systems 106 and in doing so, likely gain access to the recently subscribed-to local mobile server systems 106.

The connection routines 188 communicatively couple the wireless device 102 with networks, potentially including, for example, the SFSS 108 and the local mobile server systems 106. The connection routines work with the device transceiver 118 to gain access to the local networks 130 and transmit data between the local networks 130 and the wireless device 102.

In one embodiment, the optional subscription value optimizer ("OSVO") 190 is a module used to automatically determine the best local mobile server systems 106 to which the wireless device 102 may connect. The OSVO 190 may determine the best network based on preset, default configurations made by the SFSS 108. The OSVO may determine the best network based on user defined settings provided by the user to the wireless device 102. The OSVO 190 may not be present at all, and the available networks may be displayed to the user with terms of service in order that the user may select local mobile server systems 106.

Device drivers 192 offer the wireless device 102 general functionality. The device drivers 192 allow the components of the wireless device 102 to work, including, for example, the device output system 110, device input system 112, device memory system 114, device processor 116, and device transceiver 118. The device drivers 192 may be executed by the wireless device 102 to allow the wireless device 102 to function as a hotspot network and connect with devices to make the devices networked devices.

Figure 2:
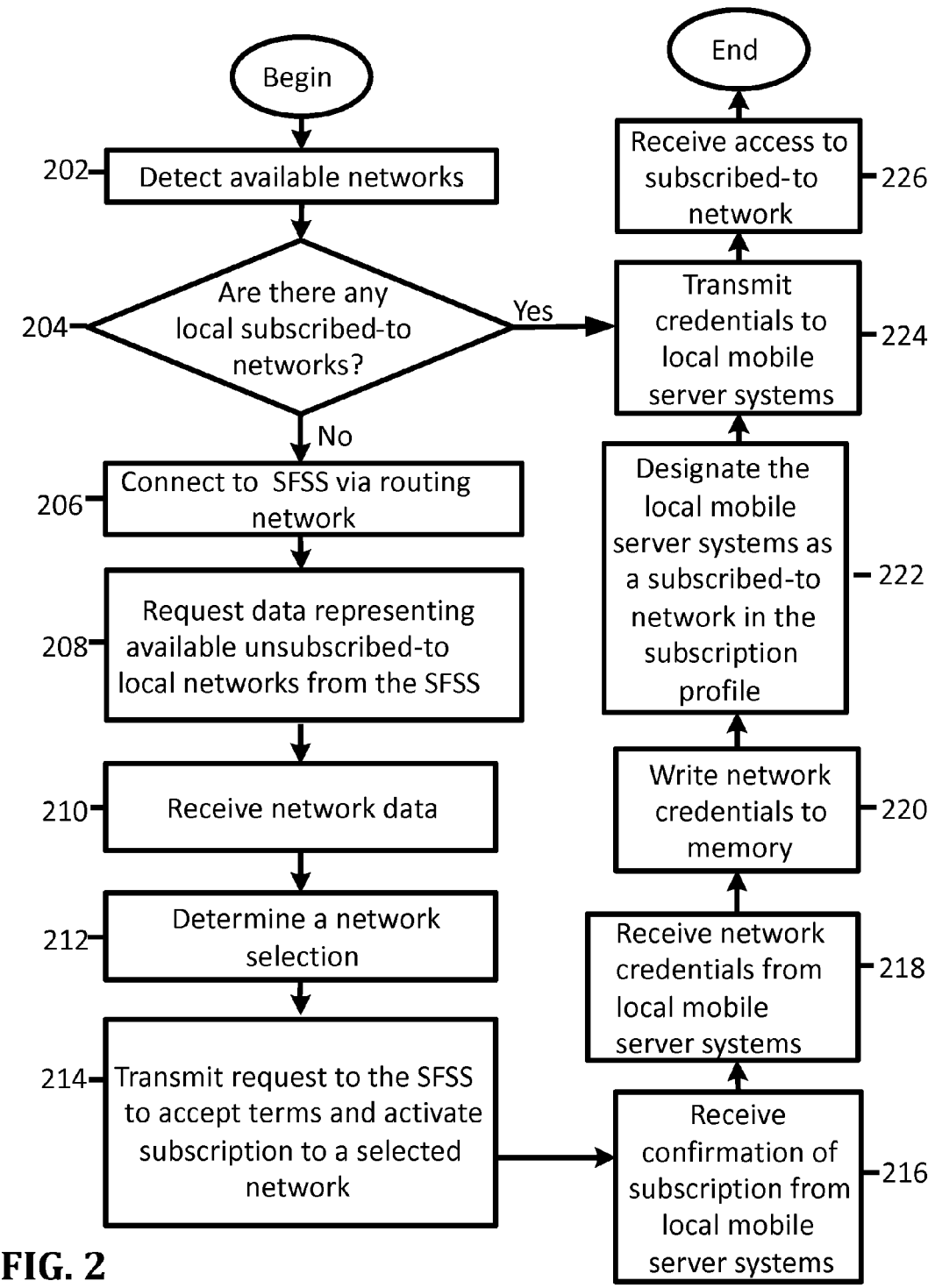
FIG. 2 shows a flowchart of an embodiment of a method for obtaining and managing subscriptions for accessing wireless networks on an ad hoc basis performed by the wireless device.

FIG. 2 shows a flowchart of an embodiment of a method 200 performed by wireless device 102 for obtaining and managing subscriptions for accessing wireless networks on an ad hoc basis. In this embodiment, the wireless device 102 may attempt to contact the SFSS 108 in order to establish a subscription with a local network and avoid roaming charges. In step 202, the wireless device 102 detects available networks. The wireless device 102 may use the device transceiver 118 to transmit requests for data regarding local networks to see if any of the networks are subscribed-to networks. In step 202, wireless device 102 to determines which local networks are within transmission range.

In step 204, the wireless device 102 determines if there are any local subscribed-to networks. If there is a subscribed-to local mobile server systems 106, method 200 proceeds to step 224, and the wireless device 102, may transmit credentials to the local subscribed-to network at step 224 (which is discussed below). If there is no subscribed-to local mobile server systems 106, method 200 proceeds to step 206, and the wireless device 102 may attempt to connect to a local network on an ad hoc basis. To begin, the wireless device may connect to the SFSS 108 via a routing network at step 206. In step 206, the wireless device 102 connects to the SFSS 108 via a routing network. The routing network is a network used to connect to the SFSS 108. The routing network may be any type of network including the local mobile server systems 106, a Wi-Fi network locally, or a Wi-Max network locally, for example. In embodiments in which an unsubscribed-to network is used to initially gain a new subscription, the user or the organization running SFSS 108 may have to pay roaming charges to connect to the service fulfillment server system of SFSS 108. Alternatively, the wireless device 102 may use alternative channels to establish a subscription including, unstructured supplementary data ("USSD") protocols, short message service ("SMS") protocols with the roaming profile, or other Internet protocol ("IP") communication channels, for example. A problem with determining which mobile phone networks are available, is if the phone has a K for one network, other networks will not allow the mobile phone to see that the other networks are present. In an embodiment, wireless device 102 automatically selects how to connect to SFSS 108, depending upon which methods are available and the costs involved. For example, wireless device 102 may determine whether there is a Wi-Fi or other connection to the Internet that is available and if there is, a connection is established, via the Internet, to SFSS 108 (so that device 102 may request what wireless phone services are available). If there is no Internet connection available to wireless device 102, wireless device 102 may determine whether there is a wireless phone network available on which the user has roaming privileges, which may be part of a plan to which the user is subscribed or a plan to which the organization running SFSS 108 is subscribed. The entity controlling SFSS 108 may purchase subscriptions to many wireless phone plans, which may give SFSS 108 roaming privileges in many locations.

In step 208, the wireless device 102 requests data representing available unsubscribed-to local networks and the networks' available services and terms of subscription which can be used on an ad hoc basis from the SFSS 108. The request may account for user preferences indicated in advance. For instance, the user may only want plans with unlimited data and can allow a preliminary filter to not subscribe to networks that fail to offer unlimited data transfer.

In step 210, the wireless device 102 receives the data about the available networks from the SFSS 108. The SFSS 108 may transmit data regarding available services and terms of service for networks configured to give network access to the wireless device 102 in a particular location. The SFSS 108 may provide this information consistent with agreements made between the entity controlling the SFSS 108 and the local mobile server systems 106 to provide credentials for connectivity on an ad hoc basis.

In step 212, local mobile server systems 106 are selected. In one embodiment, the wireless device makes the selection automatically using the optional subscription value optimizer 190. The optional value optimizer 190 may determine the best value for a subscription by established user preferences, default factory settings, firmware which can be updated, or by any mathematical algorithm, for example. In an alternative embodiment, the user may select the subscription plan and network that best suits the user. In this embodiment, the wireless device 102 may have an optional display 122 in order to list services and terms of service for the user to select. The wireless device 102 may also have an optional user input 120 to allow the user to select a plan.

In step 214, the wireless device 102 transmits a request to the SFSS 108 to accept terms and activate the subscription to the selected local mobile server systems 106 on an ad hoc basis. The acceptance may include an electronic signature signifying that a user of a wireless device 102 has accepted the terms of service. This message may be encrypted in order to protect confidential information. In an alternative embodiment, the SFSS 108 may not be involved in the transaction beyond the provision of data representing available local networks and the networks' terms of service to the wireless device 102. In this embodiment, the local mobile server systems 106 receive the request directly instead of via the SFSS 108.

In step 216, the wireless device 216 may receive confirmation that the local mobile server systems 106 acknowledged the acceptance of terms. The local mobile server systems 106 may move the identification information from the wireless device 102 from the visitor location register 146 to the home location register 146. The receipt of this confirmation may occur between the wireless device 102 and the local mobile server systems 106 via the routing network, the SFSS 108, or any other network, for example.

In step 218, the wireless device 102 receives network credentials from the local mobile server systems 106. The wireless device may receive data representing the credentials to access the local mobile server systems 106.

In step 220, the wireless device writes the credentials to memory. The credentials may be stored on the device memory system 114 or a SIM device that may or may not be integrated with the wireless device 102 (alternatively, the SIM device may be integrated into networked device 104, so that wireless device 102 is not needed). The credentials may include a K, an IMSI, location data, or any other subscriber identifier, for example.

In step 222, the wireless device 102 designates the local mobile server systems 106 as a subscribed-to network. In designating the local mobile server systems 106 as a subscribed-to network, the wireless device 102 may access the local network as if the local mobile server systems 106 were the wireless device's primary network. The designation of the local mobile server systems 106 as a subscribed-to network may cause the wireless device 102 to adjust its subscription profile 182 to account for the fact that wireless device 102 is subscribed to the local mobile server systems 106.

After step 222 (if step 204 did not find a subscribed-to network) or after step 204 (if step 204 did not find a subscribed-to network), method 200 proceeds to step 224. In step 224, the wireless device 102 transmits credentials to the subscribed-to local mobile server systems 106. The wireless device 102, in order to gain access to the secured local mobile server systems 106, may have to log in using credential supplied on an ad hoc basis by the local mobile server systems 106.

In one embodiment, the transmission of credentials may be a multistep process. For instance, the wireless device 102 may first have to provide a personal identification number in order to get the wireless device 102 or its SIM 124 to transmit credentials. The local mobile server systems 106 may search the database of network server 106 for the incoming IMSI and the K associated with the IMSI. Then the operator may generate a random number ("RAND") and signs it with the K associated with the IMSI computing a first signed response number ("SRES_1"). The operator network may send the RAND to the wireless device 102 or the SIM 124 of wireless device 102. The wireless device 102 or the SIM 124 may sign the RAND with a K producing a second signed response ("SRES_2") that is sent back to the local mobile server systems 106 with an encryption key ("$K_c$"). The local mobile server systems 106 compare the SRES_1 and SRES_2 received to information stored, and if the SER_1 and SER_2 are determined to be authentic, the wireless device 102 and/or its SIM 124 are authenticated.

In step 226, the wireless device 102 receives access to the subscribed-to, local mobile server systems 106. Upon transmitting valid credentials on an account with a current subscription or that has sufficient funds or credits for use, the local mobile server systems 106 should grant the wireless device 102 access.

In an embodiment, each of the steps of the method shown in FIG. 2 is a distinct step. In another embodiment, although depicted as distinct steps in FIG. 2, steps 202-226 may not be distinct steps. In other embodiments, the method shown in FIG. 2 may not have all of the above steps and/or may have other steps in addition to or instead of those listed above. The steps of the method shown in FIG. 2 may be performed in another order. Subsets of the steps listed above as part of the method shown in FIG. 2 may be used to form their own method.

Figure 3:
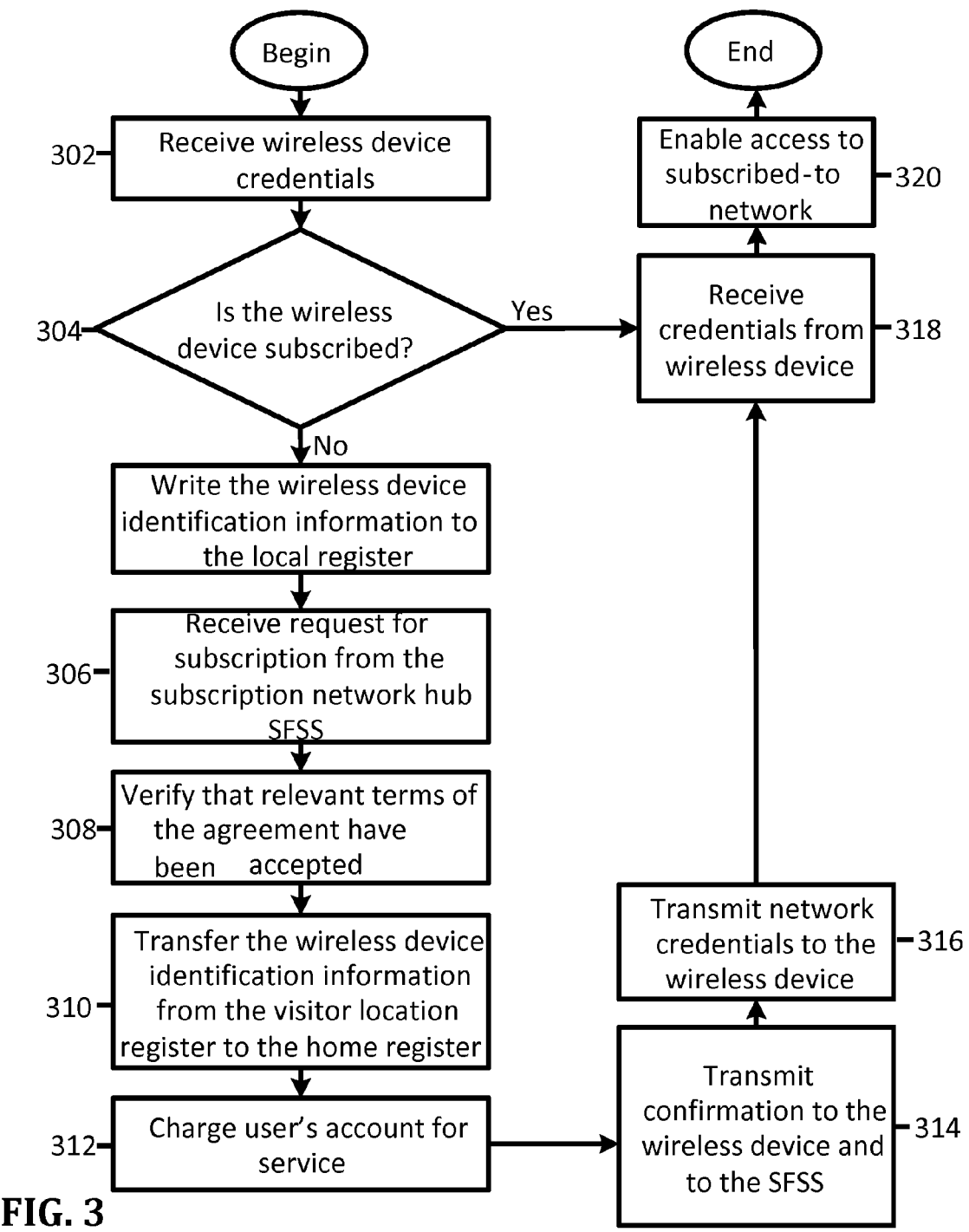
FIG. 3 shows a flowchart of an embodiment of a method for obtaining and managing subscriptions for accessing wireless networks on an ad hoc basis performed by local mobile server systems.

FIG. 3 shows a flowchart of another embodiment of a method 300 for obtaining and managing subscriptions for accessing wireless networks on an ad hoc basis, performed by the local mobile server systems 106. In this embodiment, local mobile server systems 106 may allow a wireless device 102 to subscribe and access the local mobile server systems 106. In step 302, the local mobile server systems 106 receive the wireless device's 102 credentials. The credentials may have any elements of the subscription profile 182, including, for example, the IMSI and the K. The K is typically a secret encryption key that is only stored in the wireless device memory 114 or the optional SIM device 126 and the local network's home location register 144. Therefore, it may be beneficial to encrypt the K and even the IMSI before transferring data representing the K and IMSI.

In step 304, it is determined whether the wireless device 102 is subscribed to local mobile server systems 106. The determination may be done by any, some or all of the wireless device 102, SFSS 108, and the local mobile server systems 106. The subscription profile 182 may contain data describing whether the subscription is current and still has credits. Subscription profile 182 may allow the wireless device 102 to determine on its own whether the wireless device is subscribed to a local network.

If the wireless device 102 is subscribed to the local mobile server systems 106, method 300 proceeds to step 324, where the wireless device 102 may transmit credentials at step 320 (method 320 is discussed below). If the wireless device 102 does not have a subscription, the local mobile server systems 106 may write the wireless device identification information to the visitor location register 146 at step 306.

In step 306, the local mobile server systems 106 write the wireless device 102 identification information to the visitor location register 146. The identification information may include all, some, or none of the elements stored in the subscription profile 182. The visitor location register 146 maintains the information of unsubscribed users who potentially, by default, may have to pay roaming charges to access the local mobile server systems 106.

In step 308, the local mobile server systems 106 receives request for subscription on an ad hoc basis from the SFSS 108. The SFSS 108 may transmit data representing the subscription selections made by either the user or wireless device 102 and an acceptance of terms of service. The SFSS 108 may also transmit the information about the wireless device 102 necessary for the wireless device 102 to connect to the local mobile server systems 106, for example, information necessary to have the hardware of the wireless device 102 and the local mobile server systems 106 act compatibly.

In step 310, the local mobile server systems 106 verifies that relevant terms of the ad hoc subscription agreement have been accepted by the wireless device 102 or its user. These terms may be for a particular time limit or may simply be credits or funds remaining in a user or device account. The agreement will likely stipulate the payment terms, the term of the contract, and the locations in which the contract applies, for example.

In step 312, the local mobile server systems 106 transfers the wireless device identification information from the visitor location register 146 to the home location register 144. This may signify that the wireless device 102 or user is now a subscriber and should be allowed to access the local mobile server systems 106 provided the user or wireless device 102 can supply current credentials.

In step 314, the local mobile server systems 106 charge the user account for service. The charging may occur at an account the wireless device 102 has with the entity that controls the SFSS 108. The charging may also occur at an account the wireless device 102 or user establishes with local mobile server systems 106 when subscribing. Also, the user or device may not have a dedicated account with the either the SFSS 108 or the local mobile server systems 106. In an embodiment where the user or wireless device 102 does not have a dedicated account, the user or wireless device 102 may be charged directly by any payment method including, for example, charging a checking account, savings account, debit account, trust account, gas account, expense account, government agency account or credit card account.

In step 316, the local mobile server system 106 transmits confirmation of the ad hoc subscription to the wireless device 102 and the SFSS 108. The SFSS 108 and wireless device 102 are notified that the subscription has been created and the SFSS 108 and wireless device 102 prepare to receive the credentials. In one embodiment, the SFSS 108 may not be notified of the subscription directly by the local mobile server systems 106, but may receive confirmation via the wireless device 102 or other routing network.

In step 318, the local server transmits network credentials to the wireless device 102. The wireless device 102 needs the credentials in order to access the local subscribed-to local mobile server systems 106. The credentials may include an IMSI and a K. Ks are typically closely guarded secrets, so the credentials may be transmitted with encryption in order to increase security.

In step 320, the local mobile server systems 106 receive credentials from the wireless device 102. The credentials may come from a wireless device 102 that just subscribed or had a subscription before the method was effectuated. Either way, the wireless device 102 may transmit credentials in order to gain access to the local mobile server systems 106.

In one embodiment, the transmission of credentials may be a multistep process. For instance, the wireless device 102 may first have to provide a personal identification number in order to get the wireless device 102 or its SIM 124 to transmit credentials. The local mobile server systems 106 may search the database of local mobile server systems 106 for the incoming IMSI and its associated K. Then the operator may generate a random number ("RAND") and signs the RAND with the K associated with the IMSI computing a signed response 1 number ("SRES_1"). The operator network then sends the RAND to the wireless device 102 or the SIM 124 of the wireless device 102. The wireless device 102 or the SIM 124 signs the RAND with its K producing a second signed response ("SRES_2"), which is sent back to the local mobile server systems 106 with an encryption key ("$K_g$"). The local mobile server systems 106 compares the SRES_1 and SRES_2 and if SRES_1 and SRES_2 contain information that matches the information stored at local mobile server systems 106, the wireless device 102 and/or its SIM 124 is authenticated.

In step 322, the local mobile server systems 106 enable the wireless device 102 to connect to the local mobile server systems 106. Once the wireless device 102 has access to the local mobile server systems 106, wireless device 102 may access data on the local network of local mobile server systems 106. In one embodiment, the wireless device 102 may generate a mobile hotspot network and supply the data to other networked devices 104. Generating a local hotspot may allow a person to create a mobile hotspot without accruing roaming charges in places located outside of the user's or wireless device's 102 primary coverage area.

In an embodiment, each of the steps of the method shown in FIG. 3 is a distinct step. In another embodiment, although depicted as distinct steps in FIG. 3, steps 302-322 may not be distinct steps. In other embodiments, the method shown in FIG. 3 may not have all of the above steps and/or may have other steps in addition to or instead of those listed above. The steps of the method shown in FIG. 3 may be performed in another order. Subsets of the steps listed above as part of the method shown in FIG. 3 may be used to form their own method.

Figure 4:
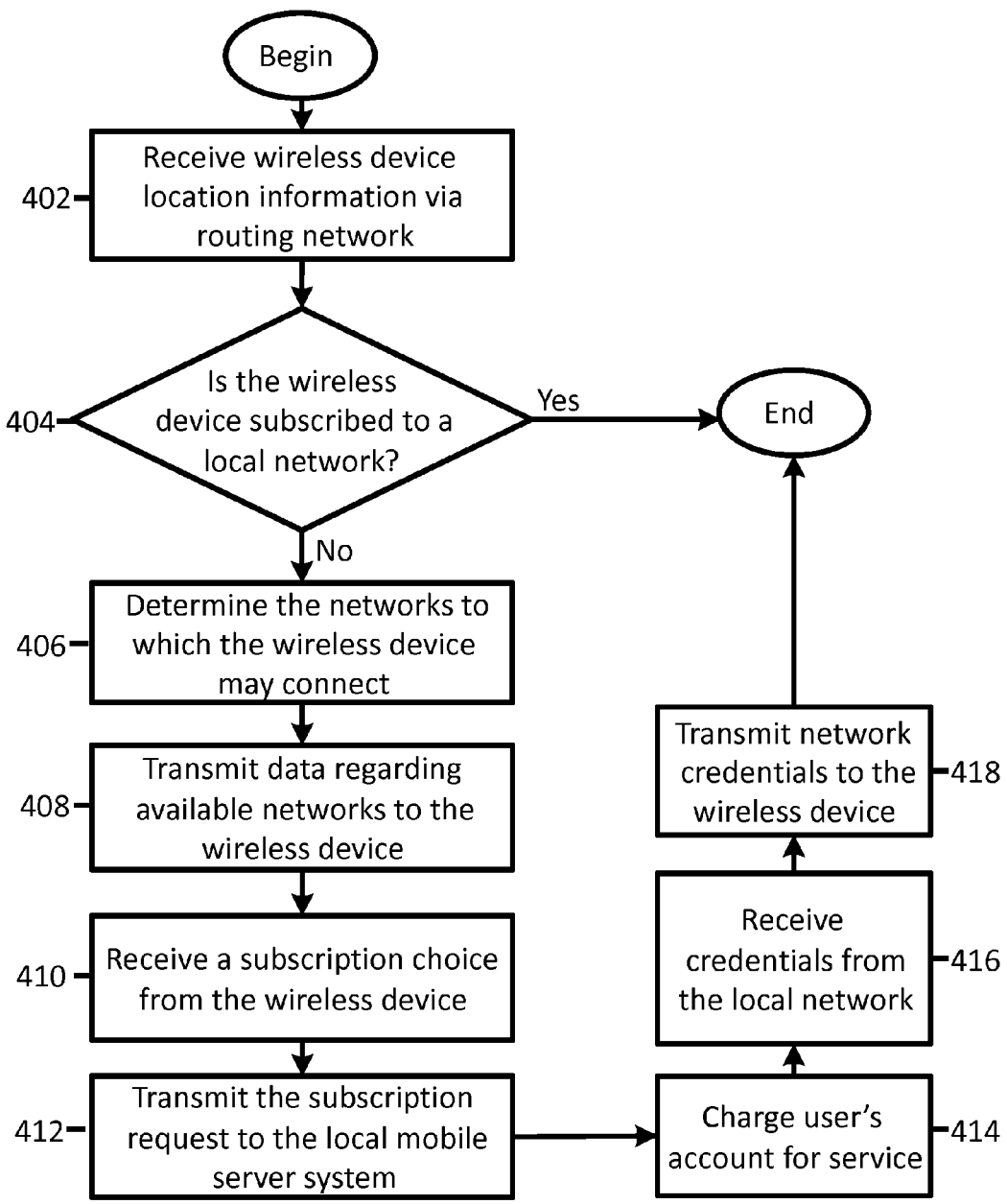
FIG. 4 shows a flowchart of an embodiment of a method for obtaining and managing subscriptions for accessing wireless networks on an ad hoc basis performed by a SFSS server.

FIG. 4 shows a flowchart of yet another embodiment of a method 400 for obtaining and managing subscriptions for accessing wireless networks on an ad hoc basis, which is performed by SFSS 108. In this embodiment, the SFSS 108 may facilitate the connection between a wireless device 102 and the unsubscribed-to local mobile server systems 106. In step 402, the SFSS 108 receives wireless device location information. The device location information can be used to determine what local networks 130 are potentially available to the wireless device 102 and, potentially, which of the local networks 130 have specific contractual arrangements with the entity controlling the SFSS 108 to allow ad hoc subscriptions.

In step 404, the SFSS 108 determines whether the wireless device 102 has a subscription to local mobile server systems 106. The SFSS 108 determines based on the location information provided in step 502 whether there are any subscribed-to local networks 130. If the SFSS 108 determines that the wireless device 102 is in an area where subscribed-to local mobile server systems 106 have coverage, the wireless device 102 may connect to the local mobile server systems 106. If the SFSS 108 finds no subscribed-to local mobile server systems 106, the SFSS 108 may determine the local networks of the local mobile server systems 106 to which the wireless device may connect at step 406.

In step 406, the SFSS 108 determines the local networks 130 to which the wireless device may connect. The SFSS 108 may determine appropriate networks for the wireless device 102 based on the location of the wireless device 102, the hardware and software limitations of the wireless device 102, and the contractual obligations of a particular entity, for example.

In step 408, the SFSS 108 transmits data regarding available networks to the wireless device 102. This data may represent a number of things including the services available, the terms of subscription, and the relevant coverage areas, for example. The data may also be organized in a way that is convenient for presenting to a user on a display, in order to allow a user to select a particular subscription plan. Alternatively, the wireless device may auto-select the best option, potentially making displayed data superfluous (although informative).

In step 410, the SFSS 108 receives a subscription choice from the wireless device 102. Regardless of whether the wireless device 102 or the user selects the subscription, the choice is made and data representing the selection is transmitted to the SFSS 108. The SFSS 108 receives the subscription choice data and likely updates the subscription register 166 in the SFSS memory system 158.

In step 412, the SFSS 108 transmits the ad hoc subscription choice from the wireless device 102 to the local mobile server systems 106. In this embodiment, the SFSS 108 may transmit the subscription data to the local mobile server systems 106. In another embodiment, the SFSS 108 may not be involved in the exchange of subscription choices, so the subscription choice could be transmitted directly from the wireless device 102 to the local mobile server systems 106 (making step 412 optional).

In step 414, the SFSS 108 charges the user or wireless device 102 account for service. The charging may occur at an account the wireless device 102 has with the entity that controls the SFSS 108. The charging may also occur at an account the wireless device 102 or user establishes with the local mobile server systems 106 when subscribing. Also, the user or wireless device 102 may not have a dedicated account with the either the SFSS 108 or the local mobile server systems 106. In that embodiment, the user or wireless device 102 may be charged directly by any payment method including, for example, charging a checking account, savings account, debit account, trust account, gas account, expense account, government agency account or credit card account.

In step 416, the SFSS 108 receives credential data from the local mobile server systems 106. This step may allow the SFSS 108 to update the version of the subscription profile 182 located in the subscription register 166 of SFSS 108. In an alternative embodiment, the SFSS 108 does not itself maintain any information regarding the subscription or only maintains information not including the secret credentials, for example. If the SFSS 108 receives the credential data, it is likely that the data will be encrypted, given the confidential nature of the credential data, and SFSS 108 and/or wireless device 102 will need to decrypt the data.

In step 418, the SFSS 108 transmits network credentials to the wireless device 102. Again, due to the sensitive nature of the credentials, in an embodiment, the SFSS 108 transmits the credentials in encrypted form. In this embodiment, the wireless device 102 may receive credentials from the SFSS 108. In an alternative embodiment, the wireless device 102 may receive the credentials directly from the local mobile server systems 106.

In one embodiment, the transmission of credentials may be a multistep process. For instance, the wireless device 102 may first have to provide a personal identification number in order to get the wireless device 102 or its SIM 124 to transmit credentials. The local mobile server systems 106 may search the database of local mobile server systems 106 for the incoming IMSI and the K associated with the IMSI. Then the operator may generate a random number ("RAND"), and sign the random number with the K associated with the IMSI computing a first signed response number ("SRES_1"). The operator network then sends the RAND to the wireless device 102 or to the SIM 124 of wireless device 102. The wireless device 102 or the SIM 124 may sign the RAND with the K of wireless device 102 or SIM 124, producing a second signed response ("SRES_2") that may be sent back to the local mobile server systems 106, encrypted with an encryption key ("$K_c$"). The local mobile server systems 106 compare the SRES_1 and SRES_2 and if the information stored in the local server 106 matches SRES_1 and SRES_2, the wireless device 102 and/or the SIM 124 of wireless device 102 may be authenticated.

Providing the wireless device 102 is given valid credentials, wireless device 102 should be able to access the local mobile server systems 106 and potentially generate a local hotspot network in order to network with networked devices 104.

In an embodiment, each of the steps of the method shown in FIG. 4 is a distinct step. In another embodiment, although depicted as distinct steps in FIG. 4, steps 402-418 may not be distinct steps. In other embodiments, the method shown in FIG. 4 may not have all of the above steps and/or may have other steps in addition to or instead of those listed above. The steps of the method shown in FIG. 4 may be performed in another order. Subsets of the steps listed above as part of the method shown in FIG. 4 may be used to form their own method.

Figure 5:
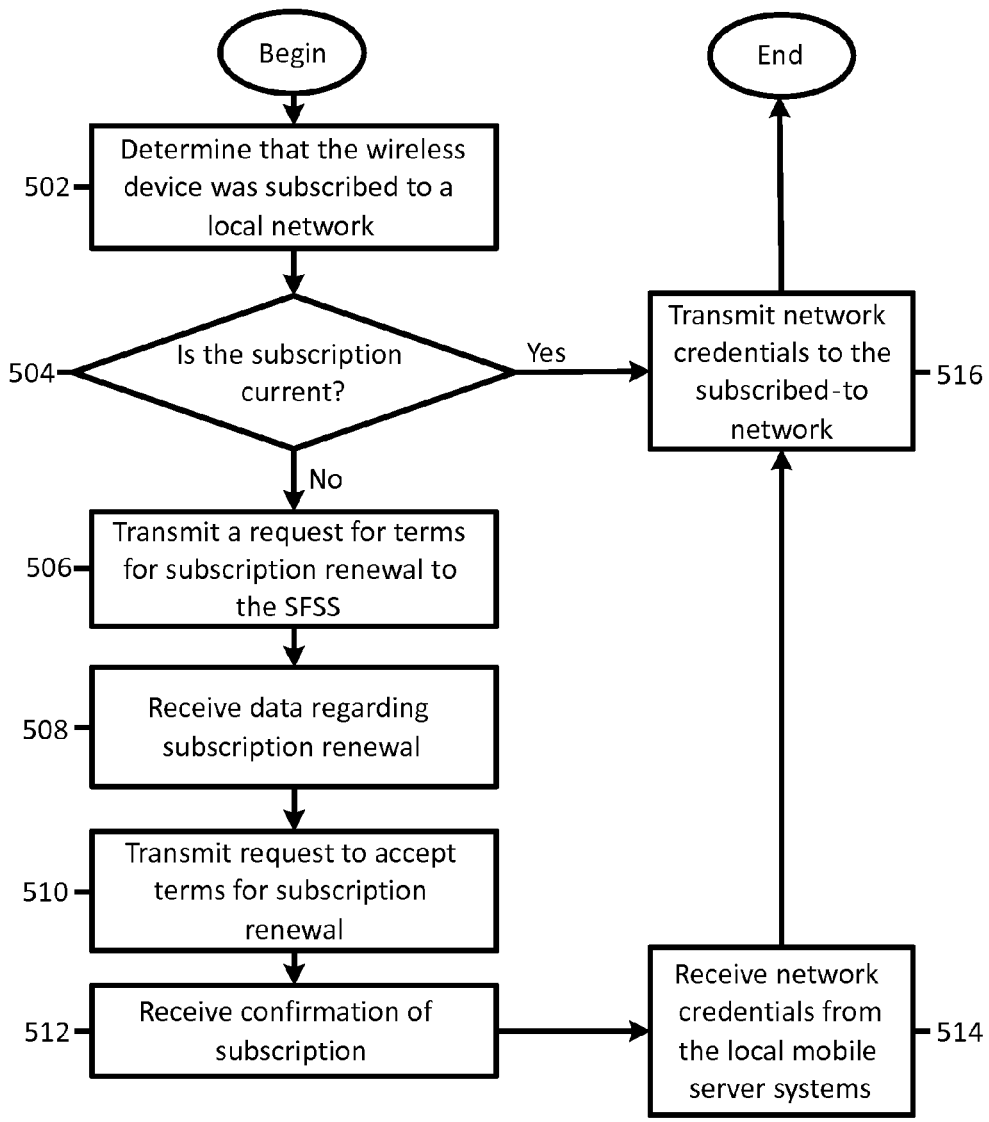
FIG. 5 shows a flowchart of an embodiment of a method of managing subscriptions for accessing wireless networks on an ad hoc basis, by the wireless device, for adding money to an account.

FIG. 5 shows a flowchart of an embodiment of a method 500 of managing subscriptions for accessing wireless networks on an ad hoc basis. In this embodiment, a subscription may no longer be current or may be depleted of credits such that a wireless device 102 may add funds or renew the subscription in order to access local mobile server systems 106.

In step 502, the wireless device 102 determines that the wireless device 102 was subscribed to local mobile server systems 106. The wireless device may look to its subscription profile 182 to determine if the wireless device 102 was subscribed to particular local mobile server systems 106. Alternatively, the wireless device 102 may rely on the subscription profile stored in the SFSS's 108 subscription register 166 to determine whether a subscription to local mobile server systems 106 is current or has sufficient credits or funds.

In step 504, the wireless device 102 may look to its subscription profile 182 to determine if a subscription is current or has sufficient funds. Alternatively, the wireless device 102 may rely on the subscription profile stored in the SFSS's 108 subscription register 166 to determine whether a subscription to local mobile server systems 106 is current or has sufficient credits or funds. If the subscription is current or has sufficient funds or credits, the wireless device 102 may transmit network credentials to the local mobile server systems 106 in order to gain access at step 516. If the subscription is not current or is depleted of funds or credits, the wireless device 102 may transmit a request or terms for subscription renewal to the SFSS at step 506.

In step 506, the wireless device 102 transmits a request for terms for subscription renewal to the SFSS 108. The wireless device 102 may request from the SFSS 108 that it transmit terms of subscription to local networks 130 in the area. This request may occur over a third party routing network, the local mobile server systems 106, or some protocol, for example.

In step 508, the wireless device 102 receives data regarding subscription renewal. The SFSS 108 may send the wireless device 102 new terms of service or the opportunity to add funds or credits to a depleted account. The network selection may be made by the user or the wireless device 102 via an optional subscription value optimizer 190, for example.

In step 510, the wireless device 102 transmits a request to accept terms for subscription renewal. The transmission may include an acceptance of the terms of service of a particular service plan or some agreement to a transaction to add funds or credits to an account.

In step 512, the wireless device 102 receives confirmation of the subscription. The wireless device 102 may receive the confirmation from either the local mobile server systems 106 or the SFSS 108. The SFSS 108 can charge an account or the local mobile server systems 106 can charge an account. The account charged can be a dedicated account for the SFSS 108, a dedicated account for the local mobile server systems 106, a savings account, checking account, expense account, credit card account, line of credit, and gas account, for example.

In step 514, the wireless device 102 may receive network credentials for the local mobile server systems 106. The wireless device 102 may receive these credentials from either the SFSS 108 or local mobile server systems 106. These credentials may be written to the wireless device memory 114 or may be stored in a dedicated SIM device.

In step 516, the wireless device 102 transmits the received network credentials to the subscribed-to local mobile server systems 106. The credentials may be confirmed and the wireless device 102 may be given access. If the wireless device 102 gains access, it may be able to generate a hotspot network and allow other networked devices 104 to access the local mobile server systems 106.

In an embodiment, each of the steps of the method shown in FIG. 5 is a distinct step. In another embodiment, although depicted as distinct steps in FIG. 5, steps 502-516 may not be distinct steps. In other embodiments, the method shown in FIG. 5 may not have all of the above steps and/or may have other steps in addition to or instead of those listed above. The steps of the method shown in FIG. 5 may be performed in another order. Subsets of the steps listed above as part of the method shown in FIG. 5 may be used to form their own method.

Figure 6:
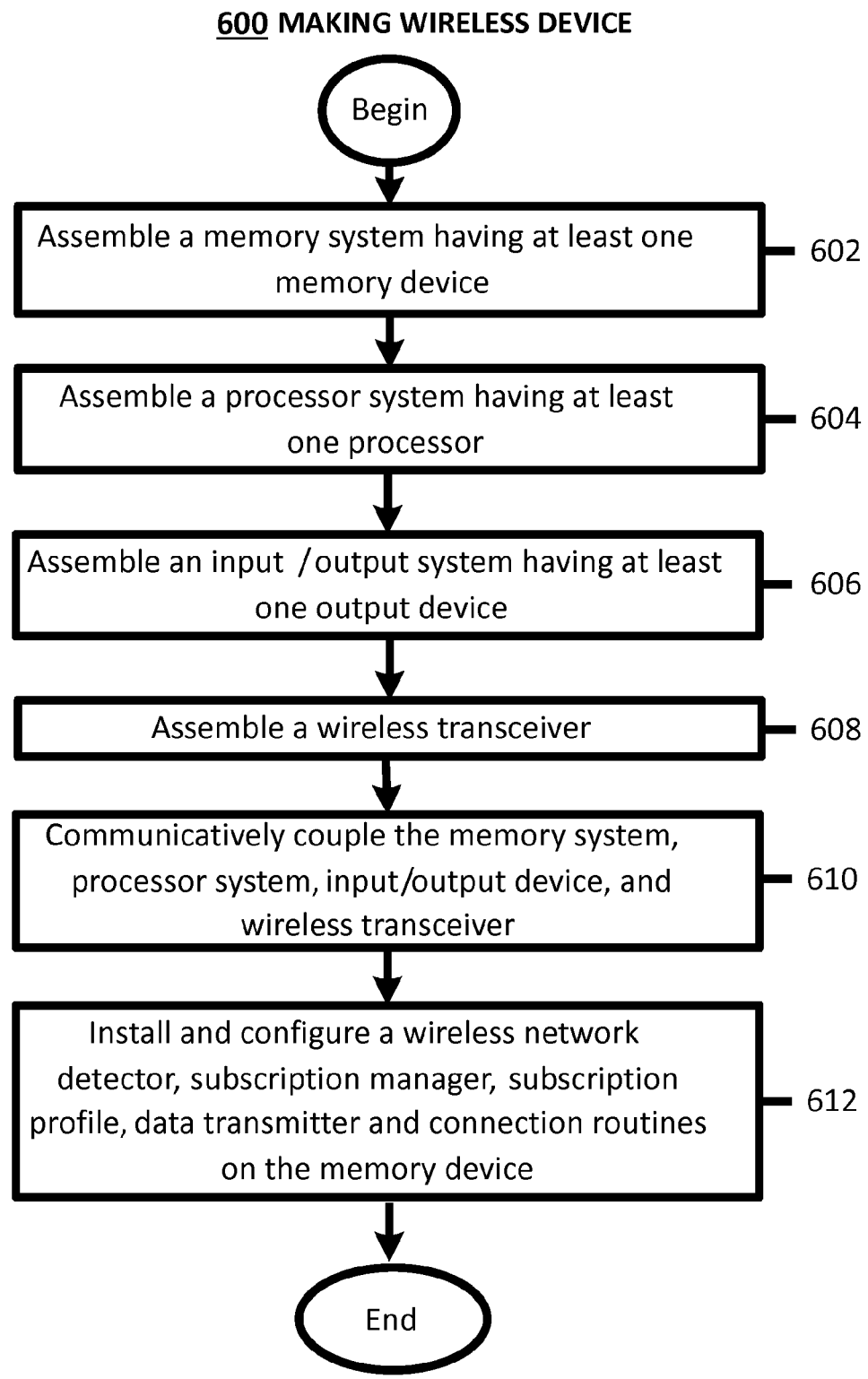
FIG. 6 shows a flowchart of an embodiment of a method for making the wireless device of FIGS. 1A and 1B.

FIG. 6 shows a flowchart of an embodiment of a method for making a wireless device 102. In step 602, the memory system is assembled with at least one memory device. The memory system may comprise any number of different memory devices including, for example, any one of, some of, any combination of, or all of a long term storage system, such as a hard drive; a short term storage system, such as a random access memory; a removable storage system such as a disk drive, floppy drive or a removable drive; and/or flash memory. The device memory system 114 may include one or more machine readable media that may store a variety of different types of information. The term machine-readable media may be used to refer to any medium capable of carrying information that is readable by a machine. One example of a machine-readable medium is a computer-readable medium.

In step 604, the device processor 116 system is assembled with at least one processor. The device processor system 116 may include any one of, some of, any combination of, or all of multiple parallel processors, a single processor, a system of processors having one or more central processors, a logic circuit and/or one or more specialized processors dedicated to specific tasks.

In step 606, the device input/output system is assembled. The device output system 110 may include any one of, some of, any combination of, or all of a display system, a printer system, a speaker system, a connection or interface system to a sound system, an interface system to peripheral devices and/or a connection and/or a interface system to a computer system, intranet, and/or internet, and the like. The device output system 110 may include a monitor and/or other output device. The device output system 110 may include an interface for sending output signals to the networked device 104 or the optional communications bus 104.

In step 608, the wireless transceiver is assembled. The device transceiver 118 is a data transmission device used to communicate data between the wireless device 102 and the SFSS 108 as well as the local mobile server systems 106. The transceiver functions as a transmitter and receiver of data including, for example, requests for data regarding local networks, credential data, subscription data, subscription selection data. In an alternative embodiment, the transceiver may be expressed as a transmitter and receiver separately. The device transceiver 118 may communicate with other networks and devices using any wireless protocol including Wi-Fi, Wi-Max, 2G, 3G, 4G, 4G LTE, UMTS, other satellite communication, or radio, for example.

In step 610, the device input/output system, the device memory system 114, the device processor system 116, and the device transceiver 118 are communicatively coupled. The device input/output system, the device memory system 114, the device transceiver 118 may be directly communicatively coupled or may be coupled via system bus to the device processor system 114.

In one embodiment, the device processor system 116 is communicatively coupled to a memory system, a wireless modem, a USB interface, wireless network interface and a device memory system 114. The memory system 114 may include a ROM, RAM, EEPROM, and removable media interface, for example. The USB interface may also be electrically coupled to a power source and communicatively coupled to a USB connector. The wireless network interface may be communicatively coupled to a wireless local area network antenna. The wireless modem may be communicatively coupled to a smart card interface and a mobile network antenna. The smart card interface may also be communicatively coupled to a smart card.

In step 612, the networking and control routines 115, including, the wireless network detector 180, the subscription profile 182, the subscription manager 184, the credential manager 186, connection routines 188, optional subscription value optimizer 190, device drivers 192 are installed and configured. The networking and control routines 115 may be installed by executable file or by OEM process, for example.

The configuration may be automated or may provide the user the opportunity to set preferences. For instance, during the configuration, a user may be asked to provide special preferences for the networks to which the user would like to connect.

In an embodiment, each of the steps of the method shown in FIG. 6 is a distinct step. In another embodiment, although depicted as distinct steps in FIG. 6, steps 602-612 may not be distinct steps. In other embodiments, the method shown in FIG. 6 may not have all of the above steps and/or may have other steps in addition to or instead of those listed above. The steps of the method shown in FIG. 6 may be performed in another order. Subsets of the steps listed above as part of the method shown in FIG. 6 may be used to form their own method.

Figure 7:
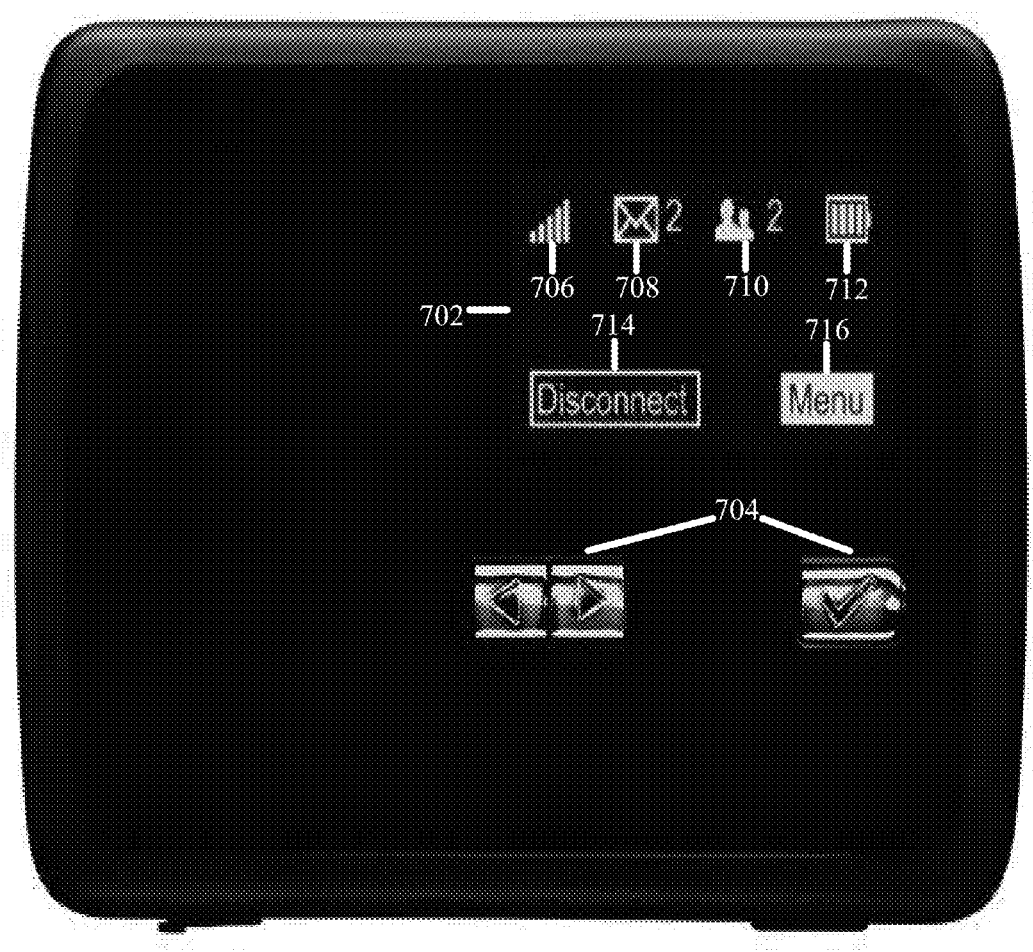
FIG. 7 shows a front view of an embodiment of the wireless device of FIGS. 1A and 1B configured to connect and subscribe to local mobile server systems on an ad hoc basis.

FIG. 7 shows a front view of an embodiment of a wireless device 102 configured to connect subscribe to local networks on an ad hoc basis. The wireless device 102 may include a display 702, a user input panel 704. In other embodiments, the wireless device 102 may not have all of the elements listed and/or may have other elements in addition to or instead of those listed.

The display 702 is a component configured to show images and notifications in order to allow a user to understand the state of the wireless device 102 and to select menu items. The display 702 may have a series of icons, including a connection strength icon 706, an unread message icon 708, a networked device icon 710, a power indicator icon 712, a disconnect icon 714, and a menu icon 716.

The connection strength icon may indicate the strength the wireless device 102 has with the local mobile server systems 106. The unread message icon 708 may indicate if the wireless device has messages that have not been read and the number of messages that are unread. The networked device icon 710 may have a number to indicate the number of devices which are networked to the wireless device 102 local hotspot network. The power indicator icon 712 may indicate how much charge the wireless device 102 may have remaining. The power indicator icon 712 may also indicate if the wireless device 102 is currently receiving a charge, by showing a picture indicating the wireless device is charging.

The disconnect icon 714 may be an icon a user can use to select that the user wishes to disconnect the wireless device 102 from a network. The menu icon 716 may be selected to display a menu for settings for the wireless device. When the menu icon 716 is selected, the display 702 may display a menu with options including, for example, connectivity preferences, device settings or manual network selection.

The user input panel 704 is a component which receives commands from a user and transmits the commands to the wireless device 102. For instance, the user input panel 704 may have directional arrows to allow navigation on a display. The user input panel 704 may also have a check or enter button in order to allow a user to execute a selection from a menu.

Figure 8:
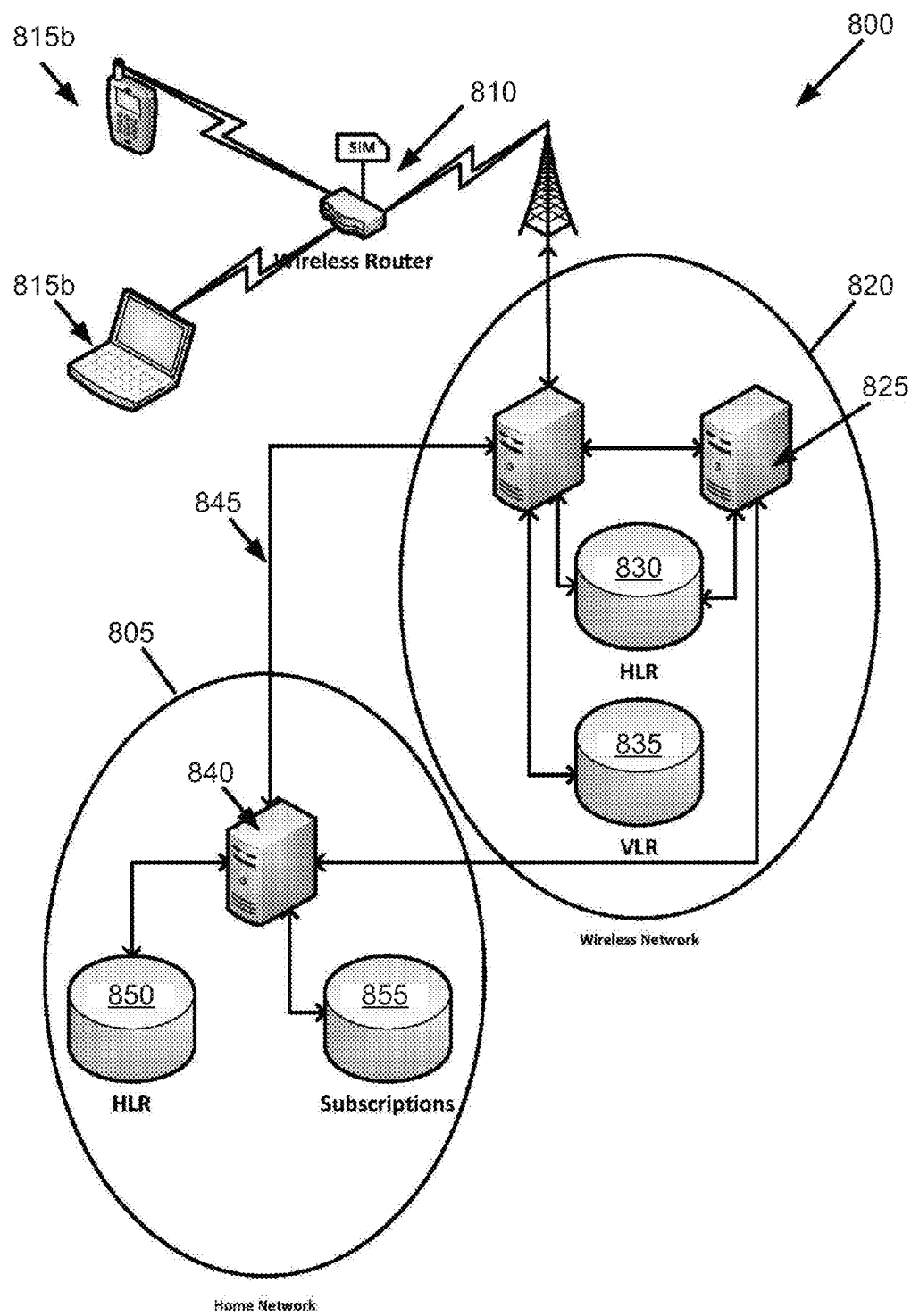
FIG. 8 is a schematic diagram of an embodiment of the architectural of a system for obtaining and managing subscriptions for accessing wireless networks on an ad hoc basis.

FIG. 8 is a schematic diagram of an embodiment of an architectural diagram of a system 800 for obtaining and managing subscriptions for accessing wireless networks on an ad hoc basis. The system 800 may include a home network 805, having the wireless device 810, a laptop 815a, cellular telephone 815b, wireless network 820, server devices 825, home location registration 830, visitor location register 835, application server 840, public and/or private communications channels 845, home location register 850, and subscriptions register 855. In other embodiments, the system 800 may not have all of the elements listed and/or may have other elements in addition to or instead of the elements listed.

Systems and methods for reusing a SIM for multiple networks are provided herein. In exemplary embodiments, the process of reuse or re-registration of SIMs may be utilized. That is, a SIM may be reused on a second network if previously registered with a first network. In some embodiments a SIM may be re-registered with an IMSI and MSISDN, or other identifying information that may be utilized by the network to recognize the device as a subscribing device. As such, the systems and methods provided herein may allow the SIM to be re-flashed and registered with a new MSISDN.

Further embodiments of the technology in an embodiment may include system and methods for suppressing the communication of SIM information and utilizing GPS location information as part of the process to reuse SIMs. Traditionally, when a device such as a cellular telephone begins to roam on a network and the device is turned on, as part of a device set up, the process begins with a preamble. In other words, the device may communicate with multiple networks and determine which is the preferred network based on the communications with the various networks. Thus, traditionally, devices with SIMs automatically send SIM information to one or more available wireless networks. The available networks then may determine that the device is a roaming device, which could prevent the SIM from being reused with a different IMSI associated with a local network.

Advantageously, suppressing SIM information and utilizing GPS, or other location information, allows for the reuse of SIMs. In order to make the SIM reusable, the communication of SIM information to the wireless networks may be suppressed. Therefore, the location of the device may be determined based on the GPS unit of the device (thus precluding the need for the device to get on the network), and then the determination is made that a particular network should be utilized for the device.

These devices and systems may cooperate in providing pre-paid international data roaming, at a lower cost, with the convenience of international data roaming. That is, users may purchase and activate subscriptions for multiple networks with the users' wireless devices. These features allow end users to traverse seamlessly in and out of the subscription areas of multiple wireless networks without incurring excessive roaming charges.

For example when a wireless device enters the subscription area of a second wireless network and exits the subscription area of a first wireless network, the wireless device may reuse the SIM by having the SIM provide an IMSI/MSISDN for the second wireless network. The wireless device may reuse the SIM as necessary depending upon the available wireless networks.

While these features may be incorporated into a multi-functional device, such as a smart-phone, advantageously, these features may be incorporated into a wireless device such as a router device that functions as an intermediary communications bridge for multiple types of computing devices such as cellular telephones, laptops, or other suitable computing devices and multiple wireless networks.

Wireless device 810 may be an embodiment of wireless device 102. When the wireless device 810 is enabled, the wireless device 810 searches for available networks. If the wireless device 810 finds a wireless network for which the wireless device 810 has a local (non-roaming) subscription, the wireless device may utilize the local (non-roaming) subscription. If the wireless device 810 finds multiple networks for which the wireless device 810 has subscriptions, the subscription with the best rate plan may be chosen, either automatically by the wireless device or via end user selection of the same.

If the device does not have a subscription for any of the available wireless networks, a wireless network may be chosen from a list of available subscriptions for the current location and available wireless networks. The list of available subscriptions may be received from a subscription manager associated with a home network. A copy of the list of available subscriptions may reside on the wireless device, and may be updated as needed.

Once a subscription is chosen from the available subscriptions, the subscription is activated on the available wireless network, by the subscription manager, and the wireless device switches to the subscription profile associated with the activated subscription and now operates on a pre-paid, non-roaming plan. When the device switches to the subscription profile associated with a subscription, that the device may reuse the SIM card of the device. That is, the device may replace any current SIM card data such as current IMSI/MSISDN with a new IMSI/MSISDN associated with the new subscription. The term "reuse" may include formatting, flashing, deleting, editing, re-writing, and combinations thereof. Reuse may also including having multiple subscription profiles, each with unique IMSI, MSISDN, Encryption keys, encryption and authentication algorithms, stored on the SIM, and switching the SIM between these profiles. Subscription profiles may be added to the SIM card as needed, or removed when they are not needed.

Communications between the device and the home network may be facilitated over unstructured supplementary service data ("USSD") protocols or short message service ("SMS") protocols with the roaming profile. In other embodiments, communications between the device and the subscription manager may be facilitated over Internet protocol ("IP") communications channels if the device is connected to the Internet over Wi-Fi.

The subscription profile sent to the home network may include of the device's location (if known) and information about each available wireless transceiver (e.g., cell phone tower) within range of the device. Information about each wireless transceiver may include the network identification, the signal strength, types of service available, and the location, if available.

According to some embodiments, the wireless device may manage multiple subscription profiles for the end user. Each subscription profile may have a unique subscriber ID, such as an international mobile subscription identity ("IMSI") along with other information such as encryption key(s), encryption algorithms, and configuration parameters for the wireless device and available wireless network. Due to the highly sensitive nature of some data, communicated data may be encrypted during transmission, utilizing one or more of the encryption algorithms. Encrypted data may be decrypted and used within a secure context on the wireless device that may be stored within the SIM card of the wireless device.

Referring now to the drawings and more particularly, to FIG. 8, an exemplary architecture of a system 800 for practicing aspects of the present invention is shown therein. The system 800 may include a home network 805 that may be communicatively coupled with a plurality of wireless devices (shown here as a single wireless device 810). The home network 805 may be an embodiment of the SFSS 108. According to some embodiments, the wireless device 810 may include any one of a number of mobile wireless devices such as a wireless router, a smart phone, computing device, a cellular telephone, a personal digital assistant, and so forth.

In some embodiments, the wireless device 810 may function as a communications bridge or router that communicatively couples end user devices such as a laptop 815a and cellular telephone 815b with one or more wireless networks (shown herein as a single wireless network 820). The laptop 815a and the cellular telephone 815b may each be an embodiment of the networked device 104. Advantageously, the wireless device 810 may include an end user device such as a cellular telephone 815b that is configured to operate as a mobile hotspot.

Generally speaking, a mobile hotspot is an end user device that allows other computing devices to utilize the communications capabilities of the end user device. In one embodiment, the mobile hotspot communicates with a provider network utilizing a communications protocol that is different than the communications protocols utilized by the end user device. For example, a laptop computing device may utilize the wireless communications protocols of a cellular telephone hotspot by way of a Wi-Fi connection established between the laptop computing device and the cellular telephone. Connecting the cellular telephone and laptop may be useful in locations where Wi-Fi communications capabilities are limited but cellular telephone communications capabilities are ubiquitous.

Rather than limiting the wireless device 810 to utilizing a single subscription profile for interacting with only one home wireless network, the wireless device 810 may be configured to maintain and utilize a plurality of subscription profiles such that the wireless device 810 may interact with multiple wireless networks while minimizing roaming charges. Allowing the wireless device 810 to interact with multiple wireless networks may reduce the need for the wireless device 810 to engage in roaming communications with these various wireless networks that are not the home wireless network of the wireless device 810. Application server 840 may be an embodiment of the hardware in SFSS 108 public and/or private communications channels 845. Home location register 850 is an embodiment of SFSS location register 164, and subscriptions register 855 may be an embodiment of subscription register 166.

In one embodiment, a wireless device 810 utilizes subscriptions for accessing wireless networks on an ad-hoc basis. The wireless device 800 may comprise a transceiver for communicatively coupling the wireless device with one or more available wireless networks and a processor for executing a routing engine that: (A) determines a presence of available wireless networks, (B) determines if the wireless device has a subscription for at least one of the available wireless networks, (C) utilizes the subscription if the routing engine determines that the wireless device has a subscription for at least one of the available wireless networks, and (D) receives subscription selections for one or more of the available wireless networks if the routing engine determines that the wireless device 810 has a subscription for at least one of the available wireless networks.

In one embodiment, a system that utilizes subscriptions for accessing wireless networks 820 on an ad-hoc basis may include: (A) a home network 805 having a subscription manager that maintains identifying information for each wireless device 810 associated therewith and maintains a plurality of available subscriptions for a plurality of wireless networks 820 and (B) a wireless device 810. The wireless device may include a transceiver for communicatively coupling the wireless device 810 to home network system 805. The wireless device 810 may further include a processor for executing a routing engine that (1) determines the presence of available wireless networks 820, (2) determines if the wireless device 810 has a subscription for at least one of the available wireless networks 820, (3) utilizes the subscription if the routing engine determines that the wireless device has a subscription for at least one of the available wireless networks 820, and (4) receives subscription selections for one or more of the available wireless networks 820 from the subscription manager of the home network 805 if the routing engine determines that the wireless device 810 does not include a subscription for at least one of the available networks.

Figure 9:
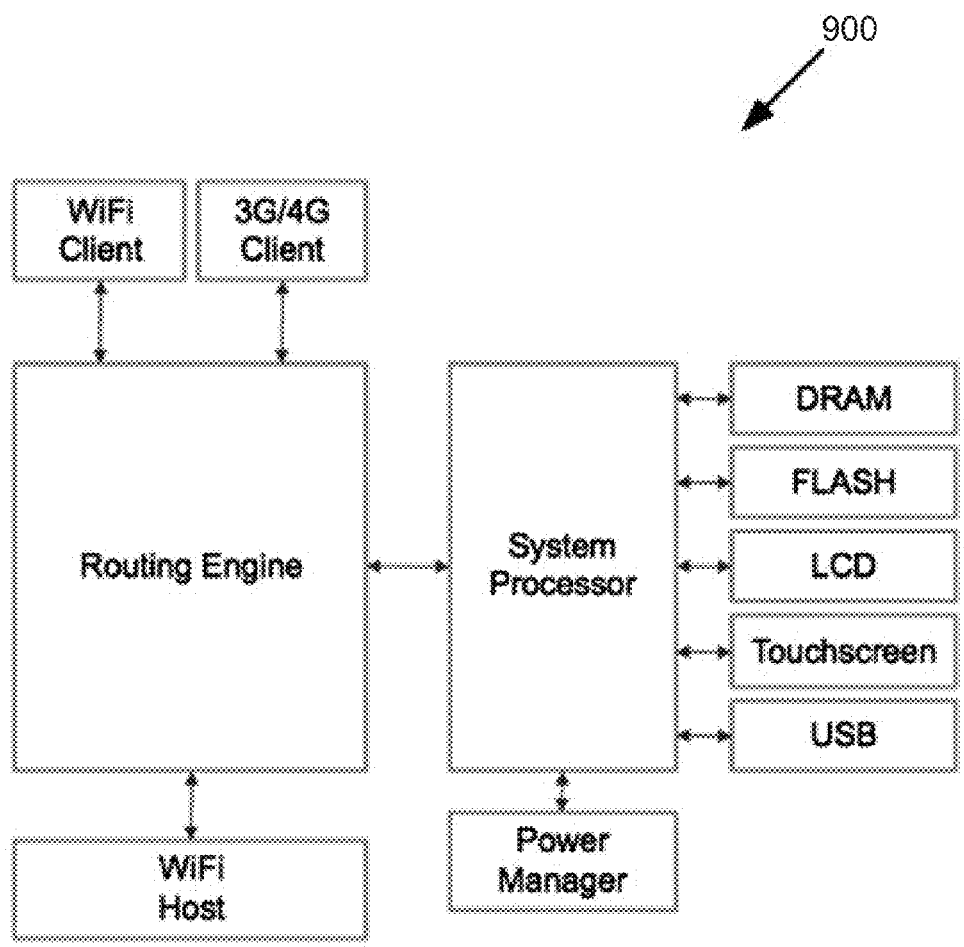
FIG. 9 is a schematic diagram of an example wireless device having a routing engine.

FIG. 9 shows a block diagram of an embodiment of a wireless device 900. The wireless device 900 may be an embodiment of wireless device 102 and wireless device 810. The wireless device 810 may include a routing engine for managing subscription profiles that allow the wireless device to interact with available wireless networks. The wireless device 810 may also include slots for multiple SIM cards, a Wi-Fi host module (for interacting as a mobile hotspot), and a power manager for reducing unnecessary power consumption by the wireless device 810.

Generally speaking the routing engine may allow the end user of the wireless device 810 to purchase subscriptions to individual wireless network providers on an ad hoc basis, only as needed.

To facilitate the use of multiple subscription profiles, the routing module may include a SIM management module for managing the data stored on one or more of the SIM card of the wireless device 810. The SIM management module may reuse, reprogram, or otherwise manage the data on one or more of the SIM cards and allow the wireless device 810 to interact with multiple wireless networks.

By way of non-limiting example, when the wireless device 810 is engaged, the home network 805 determines available wireless networks by way of global positioning satellite data received from the wireless device 810. In additional embodiments the routing engine may maintain one or more subscription profiles associated with one or more subscriber wireless networks.

The routing engine of the wireless device 810 may receive a list of available subscriber wireless networks from the home network 805. Prior to subscription activation, communication between the wireless device 810 and the home network 805 is typically facilitated via a roaming profile of the wireless device 810. Advantageously, the amount of data transferred here may be minimized to reduce the accrual of roaming charges. In some embodiments, only the GPS location of the wireless device 810 and the available wireless networks are sent to the home network 805. The home network 805 may then provide the wireless device 810 with list available subscriptions, and then the wireless device 810 sends the selected subscription back to the home network 805. The wireless device 810 may receive confirmation of the selection along with a subscription profile allowing access to the available wireless network.

Additionally, to further prevent the wireless device 810 from performing unwanted roaming operations the SIM management module may suppress the broadcasting or communication of SIM card data by the wireless device 810 until the wireless device 810 receives identifying data for accessing a wireless network.

Upon selection of a profile by an end user (or automatically by the SIM management module), the SIM management module may write a first identifying data (e.g., subscriber ID) associated with a first profile that corresponds to a first wireless network to the SIM card of the wireless device. The first identifying data may include a data such as an internal mobile subscription identity ("IMSI") that identifies the wireless device 810 as a subscribing user of the first wireless network.

Upon leaving the subscription area of the first wireless network, the wireless device 810 may again communicate with the home network 805 via a roaming profile to determine if the wireless device 810 has a subscription to one or more additional available wireless networks. If the wireless device 810 does have a subscription to one or more additional available wireless networks, the wireless device 810 may automatically select a second wireless network from the additional available wireless networks.

When engaging the second wireless network, the wireless device 810 may obtain the subscription profile for the second wireless network. The subscription profile comes from the SFSS or home network 805. The SIM management module may request a subscription profile for an additional wireless network that is within the location of the wireless device 810 from the home network 805.

In some embodiments, the wireless device 810 may obtain the subscription profile for the second wireless network by selecting a subscription plan from one or more subscription selections provided to the wireless device 810 by the home network 805.

Upon selection of a subscription plan by the end user of the wireless device 810, the SIM management module may obtain a subscription profile that contains second identifying data for registering the wireless device on the second wireless network.

The SIM management module of the wireless device 810 may then reuse the SIM card by rewriting the same with the second identifying data (e.g., IMSI and MSISDN) for the second wireless network to the SIM card of the wireless device 810. The rewriting of information onto the SIM card allows wireless device 810 to operate on the second wireless network as a pre-paid, non-roaming device.

To be sure, the wireless device 810 is not limited to interacting with only a first and/or second wireless network. The wireless device 810 may be utilized in seamless fashion across multiple wireless networks as the wireless device 810 is translated from location to location by the end user, and even country to country.

The wireless device 810 and home network 805 may be communicative coupled with one another via the wireless network 820. The wireless network 829 may be an embodiment of the local mobile server systems 106. The wireless network 820 may include a host of components that facilitate the wireless communications between wireless device 810 and other wireless devices, wired devices (e.g., through plain old telephone service "POTS"), or the Internet. The wireless network 820 may include a plurality of server devices 825, a home location register 830, and a visitor location register database 835, along with many other components. The plurality of server devices 825 may be embodiments of the components in FIG. 1C. The home location register 830 may be an embodiment of the HLR 144. The visitor location database 835 may be an embodiment of the VLR 146. A discussion of these additional components has been omitted for the sake of brevity.

The home network 805 may register a list of subscription profiles of wireless devices that have purchase subscriptions for the wireless network 820 on the home location register 830 of the wireless network 820. [0039] When a request for establishing a communications link is received from a wireless device 810, identifying information of the wireless device 810 (a subscription profile) may be ascertained by the wireless network 820 and checked against the records within the home location register 830.

In the event that the wireless network 820 determines that the wireless device 810 is associated with a subscription profile that is listed in the home location register 830, the wireless network 820 allows the wireless device to utilize the wireless network 820 (assuming subscription is not expired or exhausted).

After an initial subscription purchase operation that may be facilitated utilizing a roaming profile, the wireless device 810 may only communicate with wireless networks to which the wireless device 810 is a subscriber, until the wireless device 810 travels outside the subscriber area of the wireless network.

The home network 805 may comprise an application server 840 (or a plurality of application servers) that communicatively couples with the server devices 825 of the wireless network 820 (or multiple wireless networks) via public and/or private communications channels 845 or network connections. These communications channels 845 may include the Internet (such as with voice over Internet protocol "VOIP"), a wireless application protocol ("WAP"), a local area network ("LAN"), a wide area network ("WAN"), and a cellular communications network—just to name a few. Application server 840 may be an embodiment of SFSS 108 public and/or private communications channels 845. Home location register 850 is an embodiment of HRL 164, and subscriptions register 855 may be an embodiment subscription register 166.

The home network 805 may also include a home location register 850 that is utilized to register identifying information associated the wireless device 810 (e.g., SIM, IMEI, subscriber ID, and so forth), although the home location register 850 may include other types of identifying information for the wireless device 810. The home network may also include a subscriptions register 855 that stores profiles for the wireless devices 810 along with available subscriptions for a plurality of wireless networks.

The application server 840 may include a subscription manager (not shown) that maintains a list of purchased subscription profiles that may be utilized by wireless devices 810 along with additional available subscriptions for a plurality of wireless networks. Additionally, the subscription manager may determine the available wireless networks based upon the location of the wireless device 810 as determined by one or more wireless transceivers with range of the wireless device 810 or by way of global positioning satellite ("GPS") systems.

Each available subscription may include information such as the name of the wireless network provider, a network location, along with a rate plan that includes service details such as cost per unit of time or a pre-paid amount of time that may be debited according to usage.

A subscription profile may include identifying information for the wireless device 810 relative to a particular wireless network. For example, the wireless device 810 may be associated with a different subscriber ID for each wireless network with which the wireless device 810 has a subscription.

Figure 10:
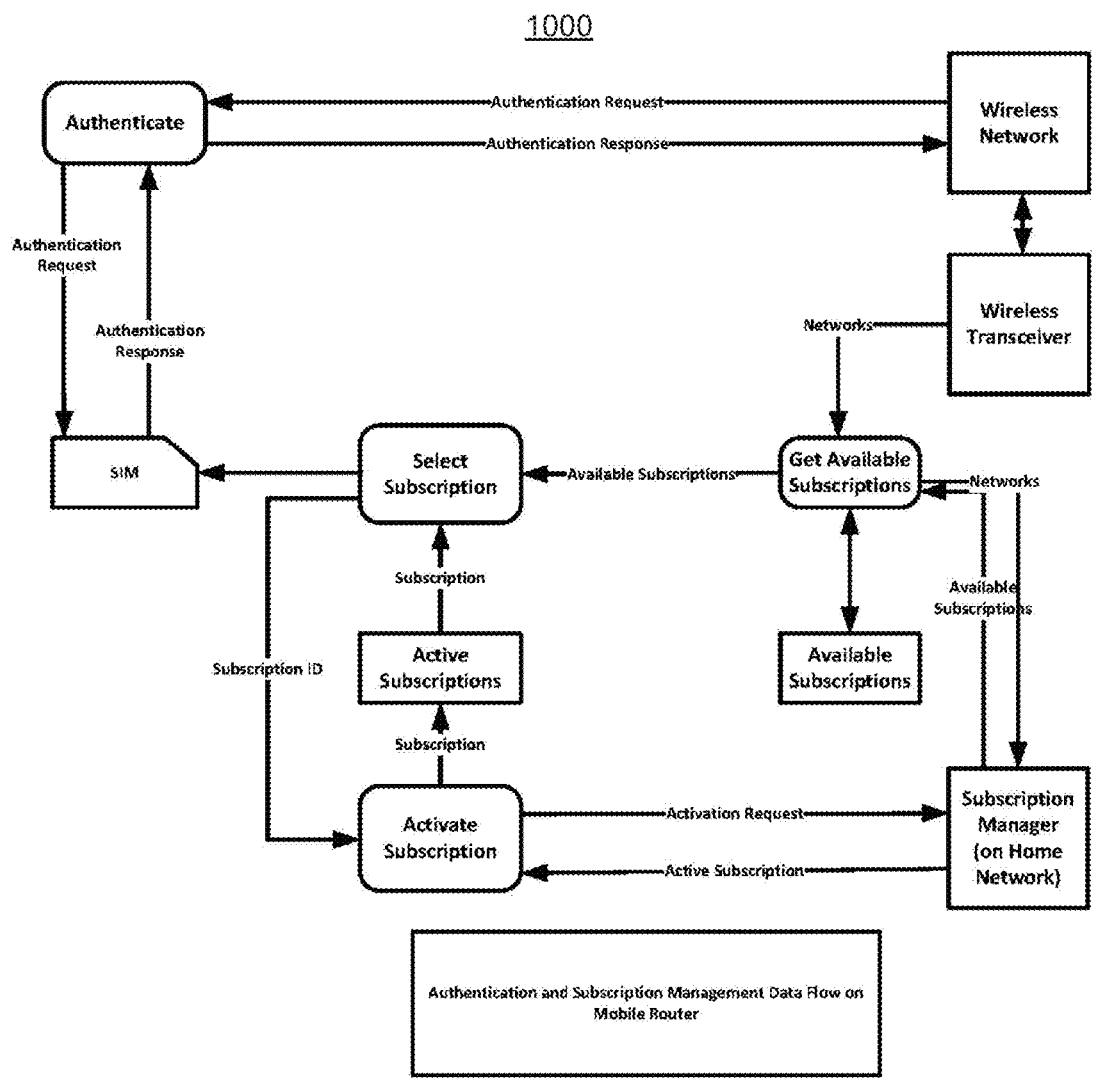
FIG. 10 is a flowchart of an embodiment of a method for utilizing subscriptions for accessing wireless networks on an ad hoc basis.

FIG. 10 is an exemplary flow diagram illustrating roaming authentication and subscription selection within the system 800. FIG. 10 illustrates a flowchart of an example of a method for selecting ad hoc subscriptions for accessing wireless networks. When the wireless device 810 is enabled, wireless device 810 searches for available wireless networks. If the wireless device 810 locates one or more available wireless networks for which the a profile has been established for the wireless device 810, if the wireless device 810 located multiple available wireless networks, and if the wireless device 810 has established a subscription with one or more of the available wireless networks, the routing engine of the wireless device 810 may evaluate the subscription information of the multiple wireless networks and select the wireless network with the most cost-efficient plan.

If the wireless device 810 does not have a profile established with any of the wireless networks, the home network 820 may provide the wireless device 810 with a rate plan for each available wireless network. Assuming only one available wireless network exists, once the wireless device 810 provides a selection of a desired rate plan, the home network 820 activates the subscription on the available wireless network.

Figure 11:
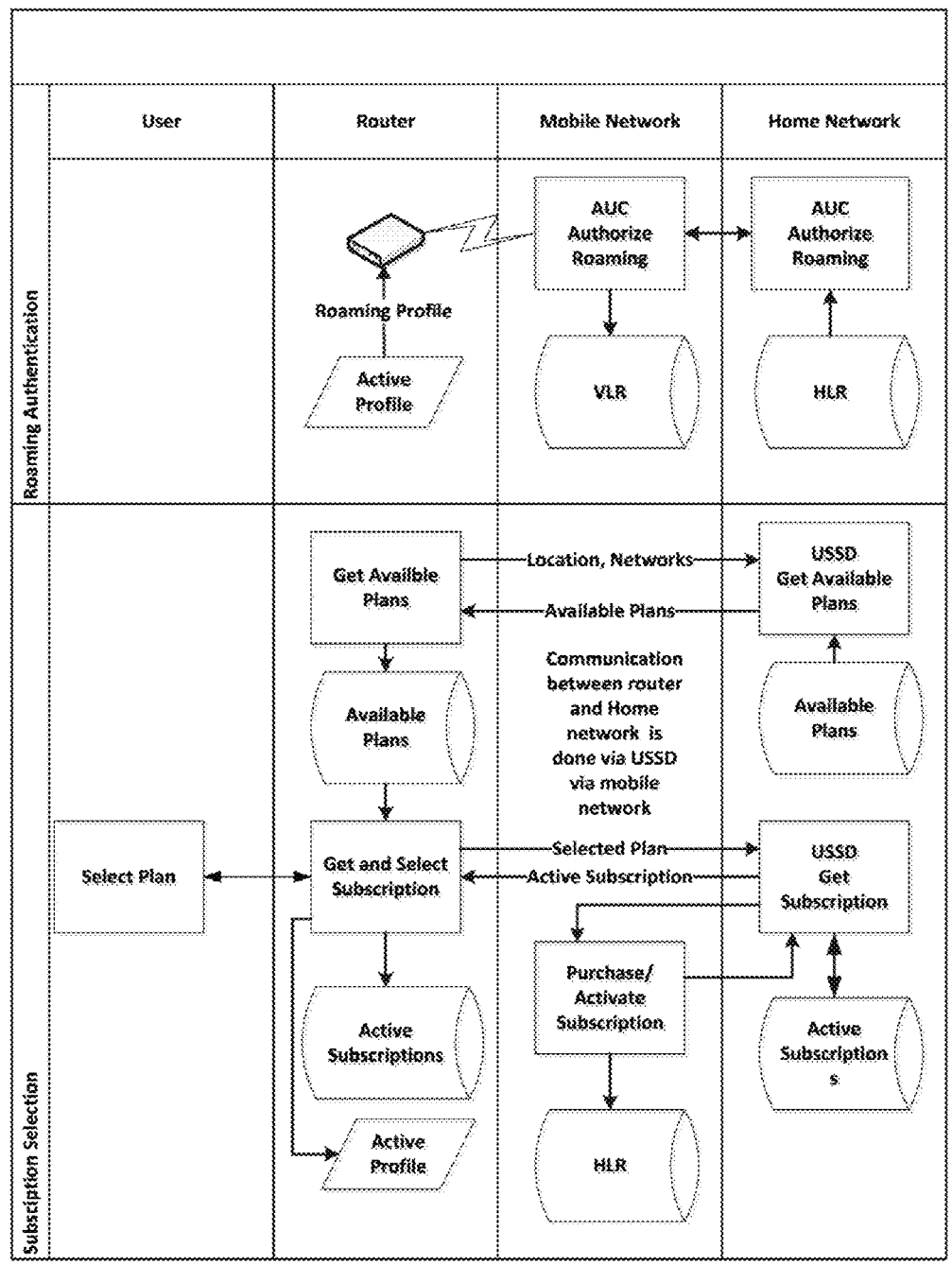
FIG. 11 is an example of a flow diagram illustrating roaming authentication and subscription selection within the system of the example.

FIG. 11 is a flow illustrating non-roaming authentication, non-roaming use, and VPN EDGE use of the wireless device 810.

Figure 12:
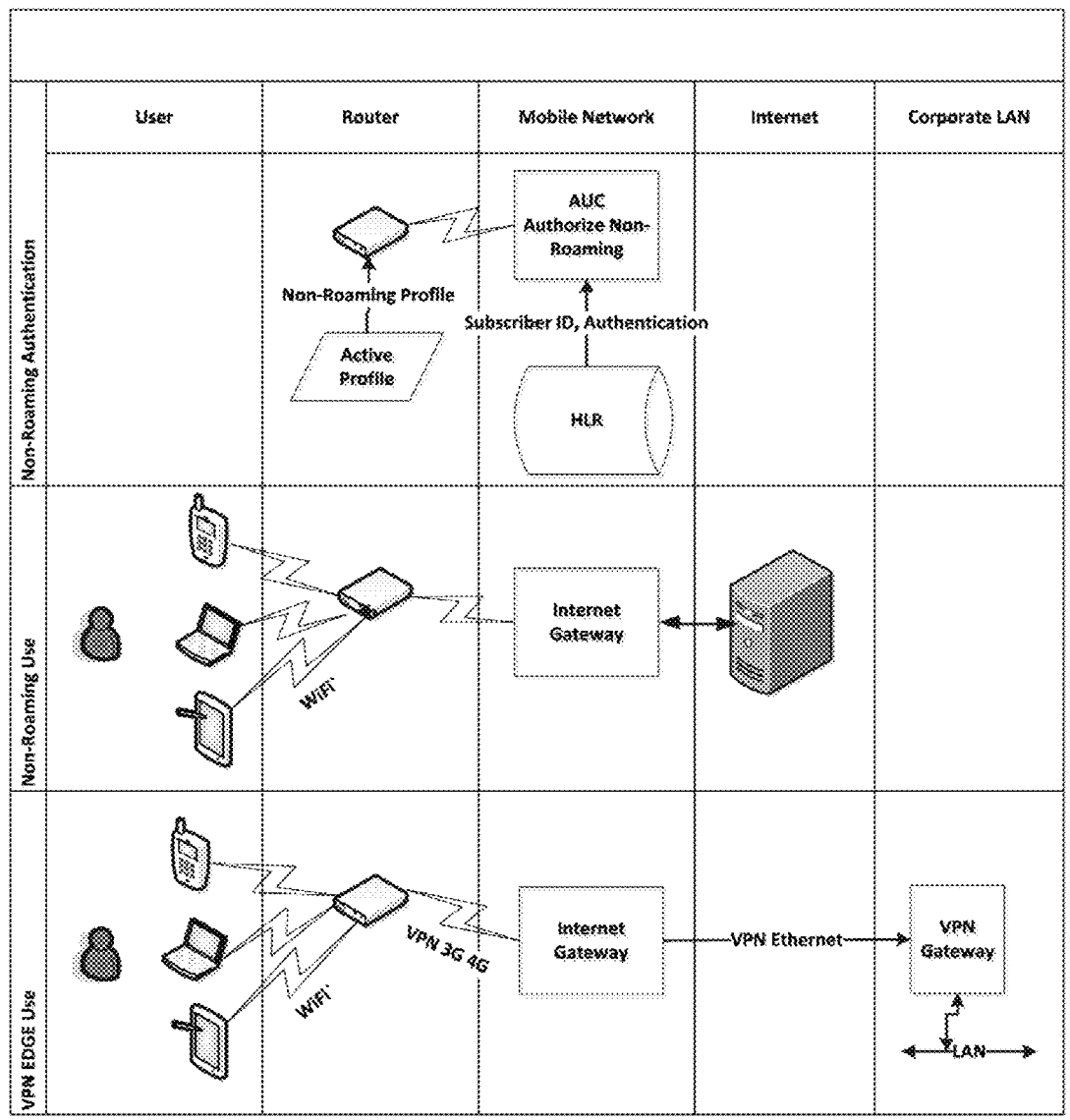
FIG. 12 is an additional flow diagram illustrating one embodiment of non-roaming authentication, non-roaming use, and VPN EDGE use of the example of the wireless device.

FIG. 12 is a flowchart of a method 500 for reusing a subscriber identity module for multiple networks. The method 500 may include the step 505 of receiving a first identifying information that corresponds to a first wireless network. The first identifying information may include data such as a subscriber ID, an IMEI, and so forth. Next, the method may include the step 510 of writing the first identifying information to the SIM card of the wireless device. Upon the wireless device traversing outside the subscription area of the first wireless network, the method may include the step 515 of receiving a second identifying information that corresponds to a second wireless network.

After receiving the second identifying information, the method may include the step 520 of rewriting the SIM card of the wireless device with the second identifying information. As with the first identifying information, the second identifying information may include data such as a subscriber ID, an IMEI, and so forth.

Although not shown, the method may include additional steps of receiving identifying information for additional wireless networks and rewriting the SIM card of the wireless device on an ad hoc basis, as the wireless device engages additional wireless networks.

Some of the above-described functions may be defined by instructions that are stored on a storage media (e.g., computer-readable media). The instructions may be retrieved and executed by the processor of the computing system on which the system is resident. Some examples of storage media are memory devices, tapes, disks, integrated circuits, and servers (including cloud based computing systems). The instructions are operational when executed by the processor to operate in accordance with the present invention. Those skilled in the art are familiar with instructions, processor(s), and storage media.

The terms "computer-readable media" and "storage media" as used herein refer to any medium or media that participate in providing instructions to a CPU for execution. Such media can take many forms, including, but not limited to, non-volatile, non-transitory media, volatile media, and transmission media. Non-volatile media include, for example, optical or magnetic disks, such as a fixed disk. Volatile media include coaxial cables, copper wire and fiber optics, among others, including the wire that comprises an embodiment of a bus. Transmission media can also take the form of acoustic or light waves, such as waves generated during radio frequency (RF) and infrared (IR) communications. Common forms of computer-readable media include, for example, a floppy disk, a flexible disk, a hard disk, magnetic tape, or any other suitable magnetic medium, a CD-ROM disk, digital video disk (DVD), any other optical medium, a RAM, a PROM, an EPROM, an EEPROM, a FLASHEPROM, or any other memory chip or cartridge, a carrier wave, or any other medium from which a computer can read.

Figure 13:
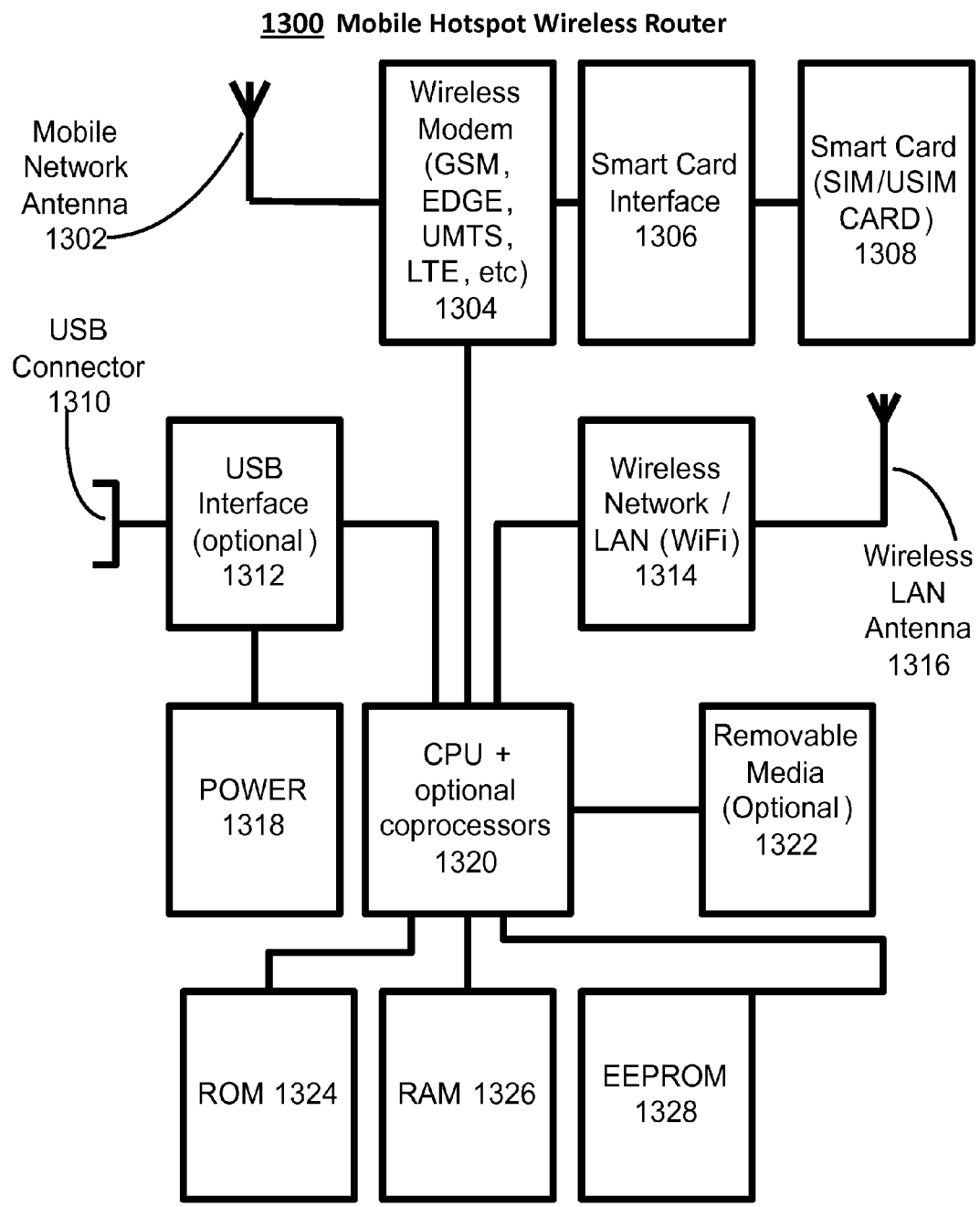
FIG. 13 shows a block diagram of an embodiment of the wireless device 102 as a mobile hotspot/wireless router ("MH") 1300.

FIG. 13 shows a block diagram of an embodiment of the wireless device 102 as a mobile hotspot/wireless router ("MH") 1300. The MH 1300 may include a mobile network antenna 1302, wireless modem 1304, smart card interface 1306, smart card 1308, USB connector 1310, USB interface 1312, wireless LAN interface 1314, wireless LAN antenna 1316, power source, mobile hotspot processor ("MHP") 1320, removable media interface 1312, read only memory ("ROM") 1324, random access memory 1326, electrically erasable programmable read-only memory ("EEPROM") 1328. In other embodiments, the system 100 may not have all of the elements listed and/or may have other elements in addition to or instead of those listed.

The MH 1300 is a device that can connect to a local, unsubscribed-to network in an ad hoc basis. The MH 1300 may use the mobile network antenna 1302 to transmit data via a wireless modem 1304 to a local network 106 or the service fulfillment server system 108. The wireless modem 1304 and/or the MH processor may be communicatively coupled to the smart card interface 1306. The wireless modem 1304 in combination with the mobile network antenna 1302 may be an embodiment of the device transceiver 118.

The smart card interface 1306 may serve as a communication medium between the MH 1300 and the smart card 1308. The smart card may be an embodiment of the optional SIM card 126.

The Universal Serial Bus ("USB") interface 1312 may is a communication medium between the MHP and the USB connector 1310 to allow for USB connectivity. The USB interface 1312 may also be electrically coupled to a power source 1318 in order to provide power for the MH 1300.

The wireless LAN interface 1314 is an interface that allows the MH 1300 to generate a hotspot network via the wireless LAN antenna 1316. The wireless LAN interface 1314 may be communicatively coupled with the MHP and the wireless LAN antenna 1316. The wireless LAN interface 1314 and the wireless LAN antenna 1316 may combine to be an embodiment of the device transceiver 118.

The MHP 1320 may be further communicatively coupled to memory devices and media interfaces including a removable media interface 1322, ROM 1324, RAM 1326, and EEPROM 1328.

The removable media interface 1322 is used to communicatively couple removable media to the MH 1300. Removable media, when communicatively coupled to the MH 1300, may be an embodiment of the device memory system 114. Removable media can be used to store any data that is useful to the subscription and credentialing routines.

The ROM 1324 is memory that may only be adjusted once and then never again. ROM 1324 may be used to store data that is not to be adjusted, for instance, an identification number unique to the MH. In one embodiment, operating software may be installed on ROM 1324. RAM 1326 is writeable memory that can be altered. RAM 1326 may be used to store variables and intermediate values as well as saved values, for example. In one embodiment, the RAM is used to store working memory, memory that is used to effectuate all processes by providing temporary storage for intermediates and variables. EEPROM 1328 may also be adjusted using variable levels of voltage. In one embodiment, the EEPROM 1328 may store information that may change over time but not as consistently as intermediates or variables. For instance, the EEPROM 1328 may store a subscription profile which is only adjusted when a user's or a device's subscriptions are modified.

Figure 14:
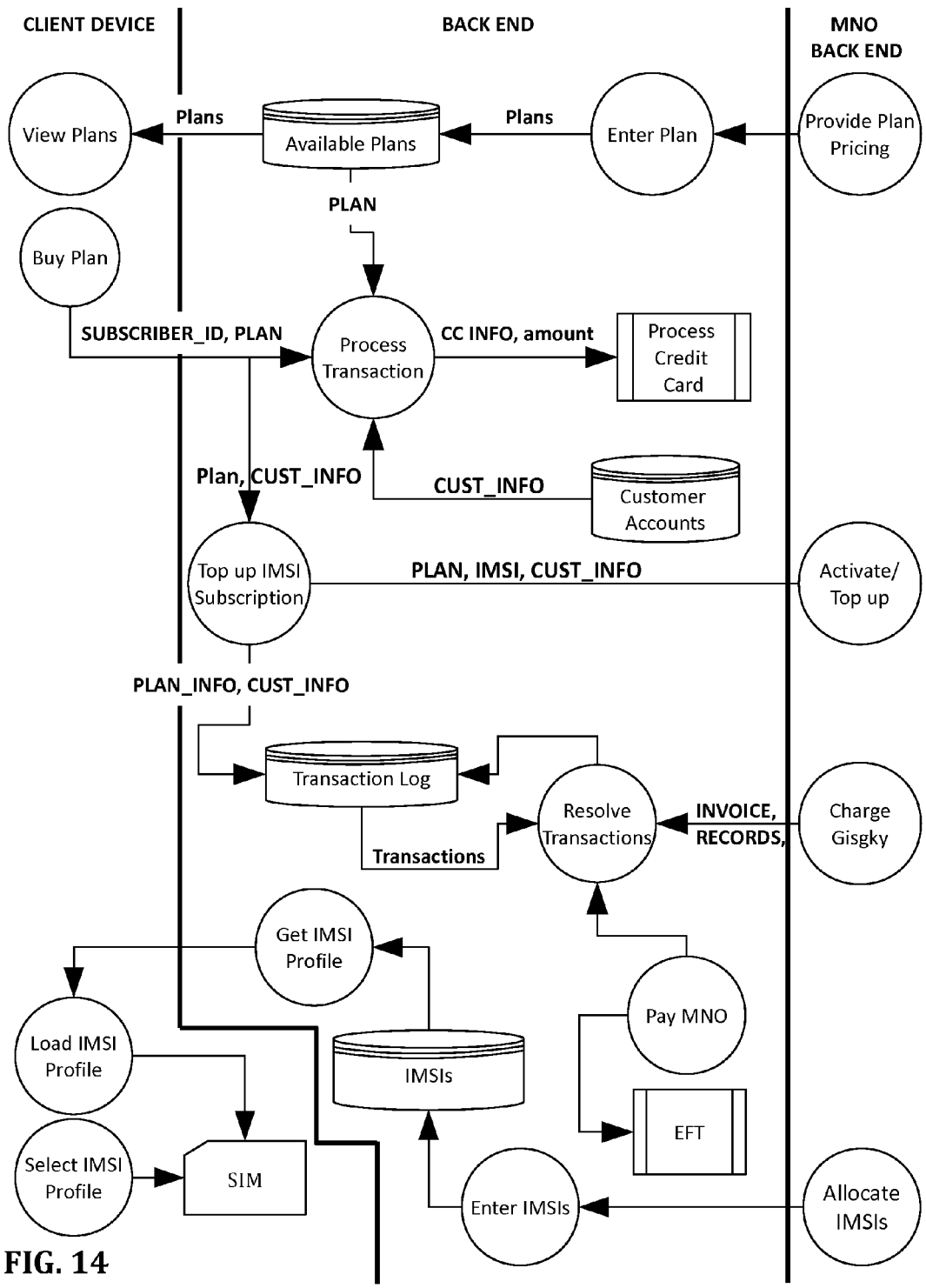
FIG. 14 shows a flowchart of an embodiment of a method and system for obtaining and managing subscriptions on an ad hoc basis.

FIG. 14 shows a flowchart of an embodiment of a method and system for obtaining and managing subscriptions on an ad hoc basis. In one embodiment, the local network 106 may be a mobile network operator. A mobile network operator ("MNO") may provide subscription and pricing information to the back end of the SFSS 108 in order to update the available subscriptions for a wireless device in a particular location. The SFSS 108 supplies to the wireless device 102 information about available plans and subscriptions for a particular location.

Upon receiving the plan or subscription data, the wireless device 102 or its user may determine that there is a plan to connect to local mobile server systems 106 worth purchasing and decide to purchase it. The wireless device 102 may transmit the subscriber ID and the plan selection to the SFSS 108 to process the transaction. The SFSS 108 may process a credit card in order to charge the wireless device 102 for the subscription. The SFSS 108 may then update its subscription register 166 to reflect that the wireless device 102 has a new subscription. In one embodiment, the wireless device 102 may have a subscription that is either not current or is depleted of funds or credits and requires that the subscriber activate the plan. The SFSS 108 can facilitate the recharging of the account by topping up an account with a particular IMSI.

Any subscription transaction may be logged in a transaction log stored in the SFMS 158. The SFSS 108 may resolve the transaction with the local mobile server systems 106 in order to be certain that both accept the transaction. The MNO may charge the SFSS 108. The SFSS 108 may pay the MNO for the subscription to the local mobile server systems 106.

Once the wireless device 102 is subscribed to access the local mobile server systems, the MNO may supply an IMSI as well as other credentials including, potentially an authentication key to the SFSS 108. The SFSS 108 may update its subscription register to account for the new IMSI(s) and other credentials. The IMSI and other credentials may be stored in an IMSI profile which can be transmitted from the SFSS 108 to the wireless device 102. When the IMSI profile is sent to the wireless device 102, the wireless device 102 may transmit the data to an optional SIM card 126. The SIM card 126 may store the IMSI profile and other credentials.

After subscribing to the local network of the local mobile server systems 106, the wireless device 102 may provide its new credentials to the local mobile server systems 106 in order to gain access to the local mobile server systems 106.

The wireless device 102 may be capable of generating a hotspot network to provide data to networked devices 104. If the wireless device 102 is able to connect to the local mobile server systems 106, the wireless device 102 may be able to provide data from the local mobile server systems 106 to the networked devices 104 via a hotspot network generated by the wireless device 102.

Each embodiment disclosed herein may be used or otherwise combined with any of the other embodiments disclosed. Any element of any embodiment may be used in any embodiment.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with the claims' full scope of equivalents.

What is claimed is:

1. A system for connecting a wireless device to a local network of local mobile server system on an ad hoc basis after the wireless device has left the manufacturer, comprising:
the wireless device having at least one processor and memory system including at least one non-transient machine readable medium storing one or more machine instructions, which when invoked cause the at least one processor to implement a process including at least
sending, from the wireless device, a request to newly establish service with the local mobile server system, the wireless device not having an international mobile subscriber identity (IMSI) that is valid for the local service prior to sending the request;
in response, receiving, at the wireless device, credential data from the local network of the local mobile server systems, the credential data including at least an IMSI that is valid for the local service; and
the processor system writing the credential data to the memory system;
wherein the credential data is received on an ad hoc basis after the wireless device has left the manufacturer.

2. The system of claim 1, wherein the local mobile server systems are controlled by a mobile network operator which owns or controls access to a radio spectrum license from a regulatory or government entity.

3. The system of claim 1, the process invoked on the wireless device further including at least:
receiving, at the wireless device, a first signed response from the local network of the local mobile server systems;
generating at the wireless device, a second signed response by signing a random number generated by the local network with an authentication key; and
transmitting the second signed response to the local network of the local mobile server systems with an encryption key.

4. The system of claim 1, wherein the wireless device transmits data in order to operate as a mobile hot spot which allows other remote devices to connect to the local network of the local mobile server systems via communication with the wireless device.

5. The system of claim 1, wherein the wireless device comprises a display output and a user input, the display output configured to display available wireless subscription plans, the user input configured to receive a user subscription selection.

6. The system of claim 1, wherein the credential data includes an authentication key.

7. The system of claim 1, the wireless device further comprising a SIM device capable of storing the credential data, the wireless device further configured to transmit a personal identification number to the local system in order to authenticate the wireless device and allow the SIM device to release the credential data stored on the SIM device to the wireless device.

8. A method for obtaining and managing subscriptions for a local network of local mobile server systems to enable a wireless device to access the local network on an ad hoc basis, comprising:
receiving, from the wireless device, a request to newly establish service with the local network, the wireless device not having an international mobile subscriber identity (IMSI) that is valid for the local service prior to sending the request;
in response, transmitting, from the local mobile server systems, an authentication key and an international mobile subscriber identity (IMSI) to a wireless device in response to the request,
wherein the data is transmitted on an ad hoc basis after the wireless device has left the manufacturer; and
establishing an account with the local mobile server system that requires the IMSI, based on the request.

9. The method of claim 8, further comprising:
searching the local mobile subscriber identity to determine if the wireless device or a user of the wireless device has a subscription to the local mobile server systems;
computing, at the local mobile server systems, a first signed response number by generating a random number and signing the random number with the authentication key and the international mobile subscriber identity;
receiving, at the local mobile server systems a second signed response signed by the authentication key from a wireless device; and
determining whether the wireless device or the user of the wireless device is authenticated based on the first signed response and the second signed response.

10. The method of claim 9, wherein the second signed response is encrypted by an encryption key.

11. The method of claim 8, further comprising transferring, by the local mobile server systems, identification information of the wireless device from a visitor location register to a home location register.

12. The method of claim 8, wherein the data representing the authentication key transmitted from the local mobile server systems is secured by an encryption algorithm.

13. The method of claim 8, wherein the local mobile server systems are controlled by a mobile network operator which owns or controls access to a radio spectrum license from a regulatory or government entity.

14. The method of claim 8, wherein the transmitting from the local mobile server systems an authentication key and an international mobile subscriber identity to the wireless device occurs by transmitting the authentication key and the international mobile subscriber identity to a service fulfillment server system and allowing the service fulfillment server system to relay the authentication key and the international mobile subscriber identity to the wireless device, the service fulfillment server system being a server that coordinates data subscriptions and allows the user located outside the coverage area of the user's current subscriptions to subscribe to a local network with local network coverage.

15. A method for obtaining and managing subscriptions for a local network of a service fulfillment server system to enable a wireless device to access a local network on an ad hoc basis, comprising;
receiving at the service fulfillment server system, a request from the wireless device for data representing available subscriptions provided by mobile network operators with at least one subscription with non-roaming, local service at a position of the wireless device, the service fulfillment server system having at least a processor system including at least one processor and a memory system having at least one machine readable non-transitory readable medium;
and
transmitting, by the service fulfillment server system, the data representing available subscriptions to the wireless device;

wherein the transmitting is done on an ad hoc basis after the wireless device has left the manufacturer; the wireless device not having an international mobile subscriber identity (IMSI) that is acceptable for obtaining local service via a local mobile server system that provides the available subscriptions;

receiving a selection of a subscription service; with the local mobile server system;

implementing instructions as the service fulfillment server that causes an IMSI to be sent to the wireless device and that newly establishes an account at the local mobile server for the wireless device.

16. The method of claim 15, further comprising:

receiving, at the service fulfillment server system, a request, from the wireless device, to accept the terms of an available subscription to a selected mobile network operator; and transmitting, from the service fulfillment server system, the request to accept the terms of an available subscription to the selected mobile network operator.

17. The method of claim 15, wherein the mobile network operators, which own or control access to a radio spectrum license from a regulatory or government entity, provide subscriptions on an ad hoc basis.

18. The method of claim 15, further comprising, modifying a subscription register stored in the memory system of the service fulfillment network to account for the wireless device's new subscription or the wireless device's user's new subscription.

19. The method of claim 15, further comprising:

receiving, at the service fulfillment server system, one or more machine instructions for optimizing the value of the available non-roaming local subscriptions which when invoked determines the available, non-roaming subscription that provides the wireless device with the best value; and transmitting, by the service fulfillment server system, the one or more machine instructions for optimizing the value of the available non-roaming local subscriptions to the wireless device.

20. The method of claim 9, further comprising:

receiving, at the service fulfillment server systems, credential data including an authentication key from the local mobile server systems; and transmitting the credential data from the service fulfillment server systems to the wireless device.

21. The system of claim 1, wherein the wireless device transmits data in order to operate as a mobile hot spot which allows other remote devices to connect to the local network of the local mobile server systems via communication with the wireless device, the mobile hot spot being a wireless device that sets up its own local network that other remote device can access, and through the mobile hot spot's local network data is transmitted to the mobile hot spot, and through the mobile hot spot to the local network of the local mobile server system the mobile hot spot is accessing.

* * * * *